(12) United States Patent
Patel et al.

(10) Patent No.: US 12,335,025 B2
(45) Date of Patent: Jun. 17, 2025

(54) MULTI-BAND RADIOFREQUENCY TRANSCEIVER

(71) Applicant: Hughes Network Systems, LLC, Germantown, MD (US)

(72) Inventors: Kumud Patel, Clarksburg, MD (US); Jack Edwin Lundstedt, Jr., Monrovia, MD (US); Walter Kepley, Gaithersburg, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 355 days.

(21) Appl. No.: 17/941,939

(22) Filed: Sep. 9, 2022

(65) Prior Publication Data

US 2023/0070699 A1 Mar. 9, 2023

Related U.S. Application Data

(60) Provisional application No. 63/242,466, filed on Sep. 9, 2021.

(51) Int. Cl.
*H04B 7/185* (2006.01)
*H04B 1/00* (2006.01)
(Continued)

(52) U.S. Cl.
CPC ....... *H04B 7/18517* (2013.01); *H04B 1/0064* (2013.01); *H04B 1/0075* (2013.01); *H04B 1/04* (2013.01); *H04B 1/16* (2013.01)

(58) Field of Classification Search
CPC ............ H04B 7/18513; H04B 7/18515; H04B 10/118; H04B 7/2041; H04B 7/18517;
(Continued)

(56) References Cited

U.S. PATENT DOCUMENTS

| 4,932,070 A | 6/1990 | Waters et al. |
| 5,535,191 A | 7/1996 | Park |

(Continued)

FOREIGN PATENT DOCUMENTS

| EP | 1482659 A2 | 12/2004 |
| JP | 3576478 B2 | 10/2004 |

OTHER PUBLICATIONS

International Preliminary Report on Patentability in International Appln. No. PCT/US2022/042757, mailed on Mar. 21, 2024, 9 pages.

(Continued)

*Primary Examiner* — Golam Sorowar
(74) *Attorney, Agent, or Firm* — Kilpatrick Townsend & Stockton LLP

(57) ABSTRACT

In some implementations, a satellite gateway includes a set of modulators comprising (i) a first modulator to modulate signals for transmission using a first of multiple polarizations, and (ii) a second modulator to modulate signals for transmission using a second of the multiple polarizations. The satellite gateway includes a set of upconverters comprising at least one upconverter for each of the multiple polarizations, wherein each of the upconverters is configured to generate a radiofrequency output by concurrently upconverting multiple intermediate frequency inputs to different frequency ranges. The satellite gateway includes an intermediate frequency distribution network configured to distribute the multiple intermediate frequency output signals from each of the modulators to the inputs of the upconverters. The satellite gateway includes a set of radiofrequency switches that are operable to selectively provide the radiofrequency outputs of the upconverters to antenna feeds for the multiple polarizations.

11 Claims, 19 Drawing Sheets

(51) Int. Cl.
*H04B 1/04* (2006.01)
*H04B 1/16* (2006.01)

(58) Field of Classification Search
CPC .... H04B 10/11; H04B 7/0413; H04B 7/0617; H04B 10/5161; H04B 10/2575; H04B 7/19; H04B 10/541; H04B 10/50; H04B 7/18543; H04B 7/18582; H04B 7/12; H04B 7/18521; H04B 10/90; H01Q 1/288; H01Q 21/065; H01Q 25/00; H01Q 19/10; H01Q 3/30; H01Q 21/0025; H01Q 1/007; H01Q 13/02; H01Q 21/245; H01Q 25/005; H04L 2025/0335; H04L 2025/0342; H04L 25/03006; H04L 25/03343; H04L 63/06; H04L 9/0858; H04L 9/3093; H04L 25/00; H04L 27/3405; H04W 12/04; H04W 84/12; H04W 72/00; H04W 16/26; H04W 16/28; H04W 76/22; H04W 76/27; H04W 88/085; H04W 92/02; H04W 4/18
See application file for complete search history.

(56) References Cited

U.S. PATENT DOCUMENTS

| | | | |
|---|---|---|---|
| 5,659,892 | A | 8/1997 | Soleimani et al. |
| 5,850,389 | A | 12/1998 | Wesler |
| 5,896,421 | A | 4/1999 | Zamat et al. |
| 5,983,085 | A | 11/1999 | Zamat et al. |
| 6,112,085 | A | 8/2000 | Garner et al. |
| 6,157,621 | A | 12/2000 | Brown et al. |
| 6,477,370 | B1 | 11/2002 | Sigler et al. |
| 6,587,687 | B1 | 7/2003 | Wiedeman |
| 6,600,730 | B1 | 7/2003 | Davis et al. |
| 6,636,721 | B2 | 10/2003 | Threadgill et al. |
| 6,650,869 | B2 | 11/2003 | Kelly et al. |
| 6,728,535 | B2 | 4/2004 | Parkman |
| 6,795,408 | B1 | 9/2004 | Hiett |
| 6,847,817 | B2 | 1/2005 | Hadinger et al. |
| 6,850,497 | B1 | 2/2005 | Sigler et al. |
| 7,164,661 | B2 | 1/2007 | Kelly |
| 7,683,842 | B1 | 3/2010 | Engel et al. |
| 8,022,781 | B2 | 9/2011 | Miller |
| 8,416,882 | B2 | 4/2013 | Corman et al. |
| 8,484,384 | B2 | 7/2013 | Tamalet et al. |
| 8,576,962 | B1 | 11/2013 | Downey et al. |
| 9,106,471 | B2 | 8/2015 | Patel et al. |
| 9,485,050 | B2 | 11/2016 | Barnard et al. |
| 9,578,646 | B2 | 2/2017 | Vasavada et al. |
| 9,628,832 | B2 | 4/2017 | Crookes et al. |
| 9,948,381 | B2 | 4/2018 | Mendelsohn et al. |
| 10,205,512 | B2 | 2/2019 | Patel et al. |
| 10,236,575 | B2 | 3/2019 | Lundstedt et al. |
| 10,588,029 | B1 | 3/2020 | Kay et al. |
| 10,727,949 | B2 | 7/2020 | Kay et al. |
| 10,797,784 | B2 | 10/2020 | Hreha et al. |
| 10,834,612 | B2 | 11/2020 | Kay et al. |
| 10,985,833 | B2 | 4/2021 | Mendelsohn et al. |
| 11,012,157 | B2 | 5/2021 | Kay et al. |
| 11,196,456 | B2 | 12/2021 | Merchlinsky |
| 11,336,493 | B1* | 5/2022 | Patel ................. H04B 7/18515 |
| 11,375,018 | B2 | 6/2022 | Binder et al. |
| 11,542,040 | B1 | 1/2023 | Hemmati |
| 11,652,541 | B1 | 5/2023 | Yao et al. |
| 11,770,179 | B2 | 9/2023 | Mendelsohn et al. |
| 11,817,938 | B2 | 11/2023 | Rohde et al. |
| 12,212,403 | B2 | 1/2025 | Patel et al. |
| 2002/0098814 | A1 | 7/2002 | Clewer et al. |
| 2002/0118725 | A1 | 8/2002 | Mollenkopf |
| 2002/0164981 | A1 | 11/2002 | Parkman |
| 2003/0045232 | A1 | 3/2003 | Parkman |
| 2003/0115608 | A1 | 6/2003 | Armstrong et al. |
| 2004/0157598 | A1 | 8/2004 | Parkman |
| 2004/0259497 | A1* | 12/2004 | Dent ................. H04B 7/18515 455/12.1 |
| 2005/0187677 | A1 | 8/2005 | Walker |
| 2009/0296847 | A1 | 12/2009 | Lee |
| 2010/0019981 | A1 | 1/2010 | Ergene et al. |
| 2012/0230300 | A1 | 9/2012 | Goerke et al. |
| 2018/0375940 | A1 | 12/2018 | Binder et al. |
| 2019/0067828 | A1 | 2/2019 | McLaren et al. |
| 2019/0132044 | A1 | 5/2019 | Hreha et al. |
| 2019/0393905 | A1 | 12/2019 | Patel et al. |
| 2020/0119811 | A1 | 4/2020 | Kay et al. |
| 2020/0187019 | A1 | 6/2020 | Kay et al. |
| 2020/0235778 | A1 | 7/2020 | Merchlinsky |
| 2020/0274611 | A1 | 8/2020 | Mendelsohn et al. |
| 2020/0322056 | A1 | 10/2020 | Kay et al. |
| 2020/0412441 | A1* | 12/2020 | Gedmark ........... H04B 7/18513 |
| 2021/0126705 | A1 | 4/2021 | Mendelsohn |
| 2021/0175966 | A1 | 6/2021 | Rohde et al. |
| 2021/0314061 | A1 | 10/2021 | Breynaert |
| 2021/0391920 | A1* | 12/2021 | Calder ................. H04L 27/2649 |
| 2022/0077597 | A1 | 3/2022 | Corman et al. |
| 2022/0209853 | A1 | 6/2022 | Border et al. |
| 2022/0337308 | A1 | 10/2022 | Liberg et al. |
| 2022/0352971 | A1 | 11/2022 | Liberg et al. |
| 2023/0071786 | A1 | 3/2023 | Regunathan et al. |
| 2023/0074318 | A1 | 3/2023 | Patel et al. |
| 2023/0141993 | A1* | 5/2023 | Rosenberg ............ H04L 27/364 370/316 |
| 2023/0224024 | A1 | 7/2023 | Mendelsohn et al. |
| 2023/0269032 | A1 | 8/2023 | Park et al. |
| 2023/0283360 | A1 | 9/2023 | Mendelsohn et al. |
| 2023/0396327 | A1 | 12/2023 | Mendelsohn et al. |
| 2024/0031001 | A1 | 1/2024 | Cheema et al. |

OTHER PUBLICATIONS

International Search Report and Written Opinion in International Appln. No. PCT/US2022/042757, mailed on Dec. 15, 2022, 16 pages.
Notice of Allowance in U.S. Appl. No. 17/704,784, mailed on Sep. 16, 2024, 8 pages.
Office Action in U.S. Appl. No. 17/704,784, mailed on Apr. 11, 2024, 16 pages.
Bookham, "The use of redundancy and control facilities in satellite modem clusters," Jan. 1, 1989, pp. 5/1-5/4.
Goki et al., "Smart Self-Coherent Optical Communication for Short Distances," Frontiers in Communications and Networks, Apr. 27, 2022, 3(867045):1-10.
http://vsatku.blogspot.com [onlne], "The Interfacility (IFL) Dual Coaxial Cables," Mar. 2009, retrieved on Feb. 10, 2023, retrieved from URL<http://vsatku.blogspot.com/2009/03/interfacility-ifl-dual-coaxial-cables.html>, 4 pages.
International Search Report and Written Opinion in International Appln. No. PCT/US2022/043109, mailed on Feb. 6, 2023, 21 pages.
Invitation to Pay Additional Fees in International Appln. No. PCT/US2022/043109, mailed on Dec. 16, 2022, 15 pages.
newerasystems.net [online], "Sector Microwave 754AP6A Baseball Switch,", Jun. 23, 2017, retrieved on Dec. 28, 2021, retrieved from URL<https://newerasystems.net/shop/amplifiers/754ap6a-baseball-switch/>, 2 pages.
Rao, "Advanced Antenna Systems for 21st Century Satellite Communications Payloads," IEEE APS Distinguished Lecture, 2015, 59 pages.
relcommtech.com [online], "Transfer relays," Jul. 30, 2021, retrieved on Dec. 28, 2021, retrieved from URL<https://relcommtech.com/products/transfer-relays/>, 2 pages.

* cited by examiner

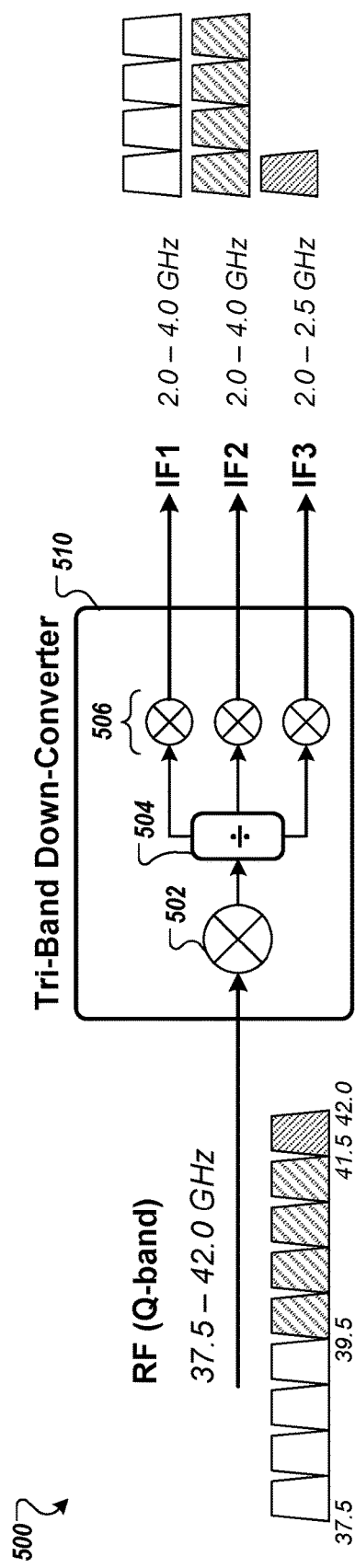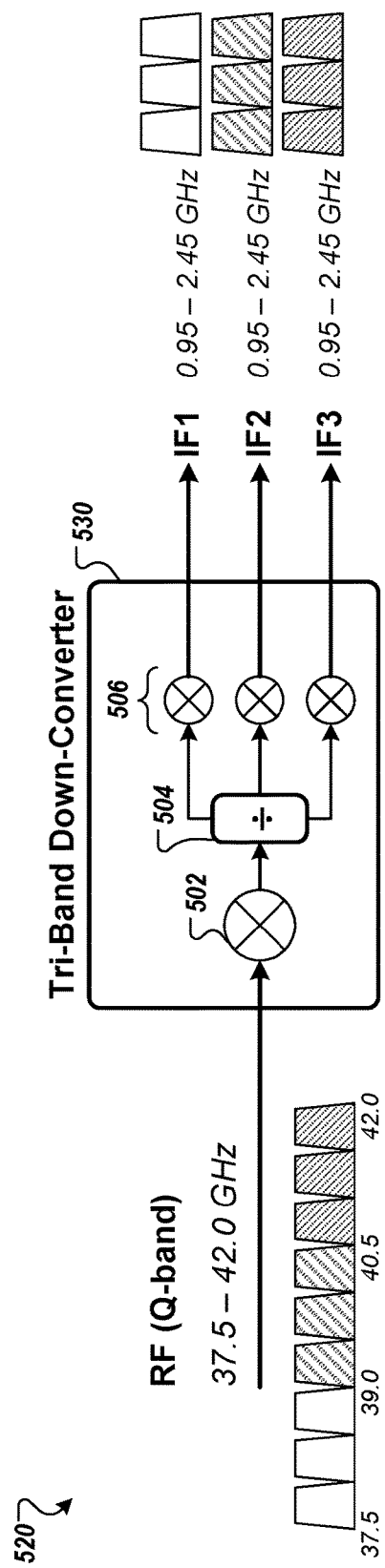
FIG. 5A
FIG. 5B

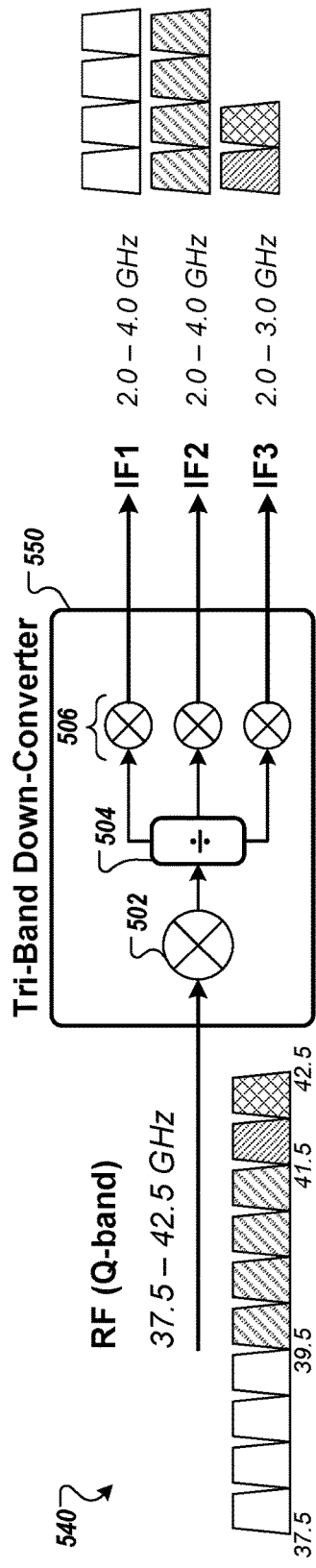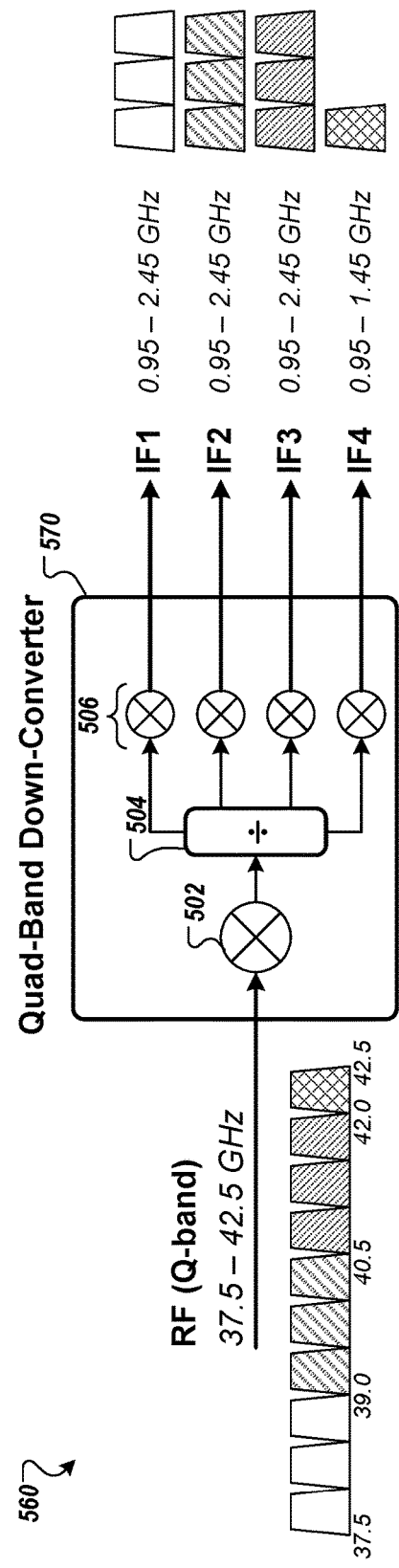
FIG. 5C
FIG. 5D

MULTI-BAND RADIOFREQUENCY TRANSCEIVER

CROSS-REFERENCE TO RELATED APPLICATIONS

This application claims the benefit of priority to U.S. Provisional Patent Application No. 63/242,466, filed on Sep. 9, 2021, the entire contents of which are incorporated by reference herein.

FIELD

This specification generally describes technology related to providing improved receivers and transmitters for communication systems, such as for gateways of satellite networks.

BACKGROUND

In a satellite communication system, a gateway is used as a ground station to connect a terrestrial network, such as the Internet, and satellites orbiting Earth. For example, the gateway can transmit data from user terminals or other devices to the orbiting satellites. Further, the gateway can receive data from the orbiting satellites and relay the data to the terrestrial network. The gateway uses antennas and other equipment for converting, transmitting, and receiving signals. For example, the gateway typically includes a down converter and demodulator to receive signals from the satellite. Similarly, the gateway typically includes a modulator, an upconverter, and a power amplifier to transmit signals to the satellite to be related to satellite terminals.

SUMMARY

In some implementations, a satellite gateway includes a receiver subsystem and a transmitter subsystem that are each configured to operate using multiple polarizations and multiple frequency channel segments. The receiver subsystem includes downconverters that each provide output for multiple bands. For example, each downconverter can provide multiple intermediate frequency outputs derived from the same radiofrequency input. Similarly, the transmitter subsystem includes upconverters that each upconvert multiple intermediate frequency input signals to different frequency ranges. Each upconverter provides a radiofrequency output that combines the modulated signals from multiple channels, each upconverted to the desired frequency range for the channel.

The satellite gateway can be configured to transmit and receive information for multiple different polarizations, such as right-hand circular polarization (RHCP) and left-hand circular polarization (LHCP). To provide resilience in the event of potential component failures, the receiver subsystem and/or the transmitter subsystem may use an intermediate frequency (IF) distribution network that enables the signals for different polarizations to be routed to multiple destinations (e.g., different demodulators for reception, or different upconverters for transmission). For example, the IF distribution network may include a switch matrix providing programmable routing of IF signals. As another example, the IF distribution network may include radiofrequency switches that enable cross-switching between different signal paths. This can enable dynamic selection of a straight coupling (e.g., signals for RHCP transmission provided to an upconverter for RHCP transmission) or cross-coupling (e.g., signals for RHCP transmission provided to a upconverter for LHCP transmission). Other IF distribution network options can include using signal dividers or splitters to provide IF signals to multiple components, or using summing elements to combine signals across inputs from different IF signals sources.

In one general aspect, a transmitter system includes: a set of modulators comprising (i) one or more first modulators to modulate signals for transmission using a first of multiple polarizations, and (ii) one or more second modulators to modulate signals for transmission using a second of the multiple polarizations, wherein the one or more modulators for each polarization are configured to provide multiple intermediate frequency outputs that overlap in frequency range and carry different data; a set of upconverters comprising at least one upconverter for each of the multiple polarizations, wherein each of the upconverters is configured to generate a radiofrequency output by concurrently upconverting multiple intermediate frequency inputs to different frequency ranges; an intermediate frequency distribution network configured to distribute the multiple intermediate frequency output signals from each of the modulators to the inputs of the upconverters; and a set of radiofrequency switches that are operable to selectively provide the radiofrequency outputs of the upconverters to antenna feeds for the multiple polarizations.

Implementations can include one or more of the following features. For example, in some implementations, each of the upconverters is configured to receive and upconvert three or four intermediate frequency signals to generate the radiofrequency output of the upconverter.

In some implementations, the intermediate frequency distribution network comprises a switch matrix that is programmable to selectively provide intermediate frequency outputs from any of the modulators to any of the upconverters.

In some implementations, the intermediate frequency distribution network comprises a set of switches that are programmable to selectively provide cross-switching to change routing of the intermediate frequency outputs from the modulators to different upconverters. In some implementations, the modulators each have a primary output and a secondary output for each intermediate frequency output, and each of the modulators includes a switch to select between providing output on the primary output or the secondary output; and the intermediate frequency distribution network comprises a set of summing elements that each combine (1) intermediate frequency signals on a primary output of a modulator for the first polarization and (2) intermediate frequency signals on a secondary output of a modulator for the first polarization, the intermediate frequency distribution network being configured to provide the combined output of the respective summing elements as inputs to the upconverters.

In some implementations, the multiple polarizations include right-hand circular polarization and left-hand circular polarization.

In some implementations, the transmitter system is configured to transmit signals in the V band, over a bandwidth of at least 4 GHz.

In some implementations, the transmitter system is configured to transmit data for a plurality of different channel segments, and each of the multiple intermediate frequency outputs of the modulators includes modulated signals for multiple of the channel segments.

In some implementations, the transmitter system is configured to transmit signals for each of the multiple polarizations in multiple channel segments each having bandwidth between 250 MHz and 2 GHz.

In some implementations, the transmitter system is configured to transmit signals for each of the multiple polarizations in at least eight channel segments each having bandwidth of substantially 500 MHz.

In another general aspect, a receiver system includes: a set of downconverters comprising (i) a first downconverter to downconvert signals received for a first of multiple polarizations, and (ii) a second downconverter to downconvert signals received for a second of the multiple polarizations, wherein each of the downconverters is configured to provide multiple intermediate frequency outputs that overlap in frequency range and carry different data; a set of demodulators comprising at least one demodulator for each of the multiple polarizations, wherein each of the demodulators is configured to extract data from a different intermediate frequency signal; an intermediate frequency distribution network configured to distribute the multiple intermediate frequency output signals from each of the downconverters to the inputs of the demodulators; and a network interface configured to provide extracted data to a communication network.

Implementations can include one or more of the following features. For example, each of the downconverters is configured to output three or four intermediate frequency signals based on an input radiofrequency signal.

In some implementations, the receiver system includes a third downconverter; and a set of radiofrequency switches that are operable to (i) selectively switch radiofrequency input for the first of the multiple polarizations from the first downconverter to the third downconverter, and (i) selectively switch radiofrequency input for the second of the multiple polarizations from the second downconverter to the third downconverter.

In some implementations, the intermediate frequency distribution network comprises a switch matrix that is programmable to selectively provide intermediate frequency outputs from any of the downconverters to at least one demodulator in any of multiple different groups of demodulators.

In some implementations, the intermediate frequency distribution network comprises frequency dividers for each down converter, the frequency dividers providing the output of a downconverter to each of multiple sets of demodulators.

In some implementations, the multiple polarizations include right-hand circular polarization and left-hand circular polarization.

In some implementations, the receiver system is configured to receive signals in the Q band, over a bandwidth of at least 4 GHz.

In some implementations, the receiver system is configured to receive data for a plurality of different channel segments, and each of the multiple intermediate frequency outputs of the downconverters includes modulated signals for multiple of the channel segments.

In some implementations, the receiver system is configured to receive signals for each of the multiple polarizations in multiple channel segments each having bandwidth between 250 MHz and 2 GHz.

In some implementations, the receiver system is configured to receive signals for each of the multiple polarizations in at least eight channel segments each having bandwidth of substantially 500 MHz.

In another general aspect, a satellite gateway includes a receiver subsystem and a transmitter subsystem. The transmitter subsystem includes: a set of modulators comprising (i) one or more first modulators to modulate signals for transmission using a first of multiple polarizations, and (ii) one or more second modulators to modulate signals for transmission using a second of the multiple polarizations, wherein the one or more modulators for each polarization are configured to provide multiple intermediate frequency outputs that overlap in frequency range and carry different data; a set of upconverters comprising at least one upconverter for each of the multiple polarizations, wherein each of the upconverters is configured to generate a radiofrequency output by concurrently upconverting multiple intermediate frequency inputs to different frequency ranges; an intermediate frequency distribution network configured to distribute the multiple intermediate frequency output signals from each of the modulators to the inputs of the upconverters; and a set of radiofrequency switches that are operable to selectively provide the radiofrequency outputs of the upconverters to antenna feeds for the multiple polarizations. The receiver subsystem includes: a set of downconverters comprising (i) a first downconverter to downconvert signals received for a first of multiple polarizations, and (ii) a second downconverter to downconvert signals received for a second of the multiple polarizations, wherein each of the downconverters is configured to provide multiple intermediate frequency outputs that overlap in frequency range and carry different data; a set of demodulators comprising at least one demodulator for each of the multiple polarizations, wherein each of the demodulators is configured to extract data from a different intermediate frequency signal; an intermediate frequency distribution network configured to distribute the multiple intermediate frequency output signals from each of the downconverters to the inputs of the demodulators; and a network interface configured to provide extracted data to a communication network.

In some implementations, the satellite gateway is configured to receive signals in the Q band, and to transmit signals in the V band.

In some implementations, the satellite gateway is configured to receive over a bandwidth of at least 4.5 GHz.

In some implementations, the satellite gateway is configured to transmit over at bandwidth of at least 4 GHz.

In some implementations, the satellite gateway is configured to receive signals over a range of 37.5-42.5 GHz.

In some implementations, the satellite gateway is configured to transmit signals over ranges of 47.2-50.2 GHz and 50.4-51.4 GHz.

In some implementations, the satellite gateway is configured to receive signals 9 or 10 channel segments of substantially 500 MHz.

In some implementations, the satellite gateway is configured to transmit signals for at least 8 channel segments of substantially 500 MHz.

In some implementations, the satellite gateway and an associated antenna are configured to achieve cross-polar discrimination (XPD) of at least 30 dB.

In some implementations, the satellite gateway is configured to use intermediate frequencies in range from 0.5 to 5.0 GHz.

In some implementations, the intermediate frequency signals includes L band signals and/or S band signals.

In another general aspect, a method includes: receiving, over a network interface, data for transmission in a satellite communication system; generating multiple intermediate frequency outputs for each of multiple polarizations by modulating one or more carriers based on the data for transmission using one or more first modulators for a first polarization and one or more modulators for a second polarization, wherein the one or more modulators for each polarization are configured to provide multiple intermediate frequency outputs that overlap in frequency range and carry different data; distributing the multiple intermediate frequency output signals for each polarization from the modulators to the inputs of a set of upconverters, the set of upconverters comprising at least one upconverter for each of the multiple polarizations; upconverting, for each polarization, the multiple intermediate frequency outputs for the polarization using the at least one upconverter for the polarization, wherein each of the upconverters is configured to generate a radiofrequency output by concurrently upconverting multiple intermediate frequency inputs to different frequency ranges; and routing the radiofrequency outputs to antenna feeds using a set of radiofrequency switches.

In another general aspect, a method comprises: receiving radiofrequency signals for each of the multiple polarizations; downconverting the radiofrequency signals using (i) a first downconverter to downconvert signals received for the first polarization, and (ii) a second downconverter to downconvert signals received for the second polarization, wherein each of the downconverters is configured to provide multiple intermediate frequency outputs that overlap in frequency range and carry different data; distributing the multiple intermediate frequency output signals from the downconverters to inputs of a set of demodulators using a second intermediate frequency distribution network, the set of demodulators comprising at least one demodulator for each of the multiple polarizations; demodulating the multiple intermediate frequency output signals from the downconverters using the set of demodulators; and providing, to a communication network, extracted data obtained from demodulating the multiple intermediate frequency output signals.

The details of one or more implementations are set forth in the accompanying drawings and the description below. Other potential features and advantages will become apparent from the description, the drawings, and the claims.

BRIEF DESCRIPTION OF THE DRAWINGS

FIGS. 5A-5D are diagrams that illustrate various downlink frequency plans for the satellite gateway.

In the drawings, like reference numbers represent corresponding parts throughout.

DETAILED DESCRIPTION

Figure 1:
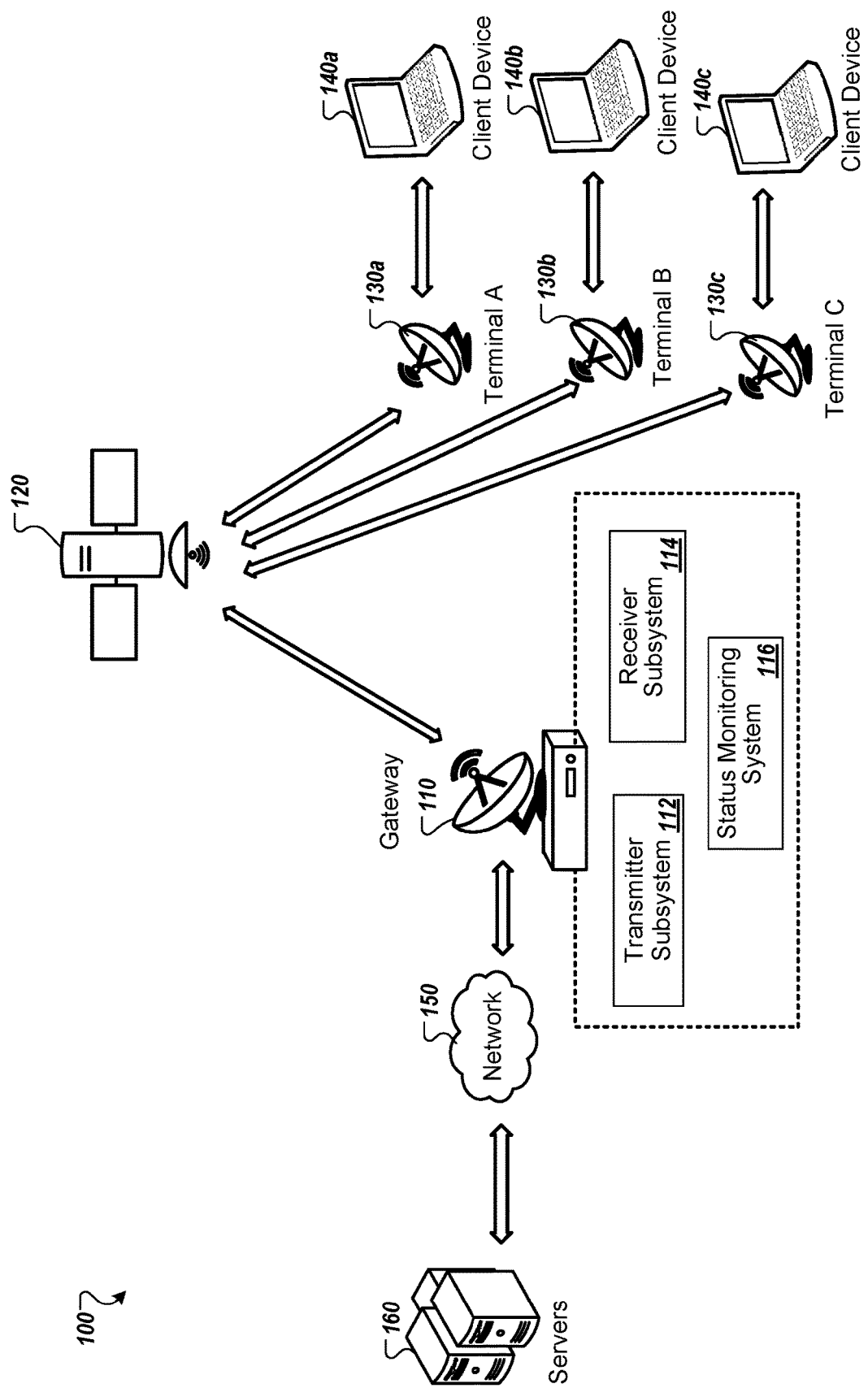
FIG. 1 is a diagram that illustrates an example of a satellite networking system.

FIG. 1 shows an example of a satellite communication system 100. The system 100 includes a satellite gateway 110 that communicates with one or more satellites 120 to provide network access to various satellite terminals 130a-130c. Each satellite terminal 130a-130c can be a VSAT that provides network access to one or more client devices 140a-140c (e.g., phones, laptop computers, desktop computers, Internet of Things (IoT) devices, appliances, etc.). The gateway 110 connects to a network 150, such as a wide area network, core network, or other public network such as the Internet. Various servers 160 and other devices can communicate with the client devices 140a-140c through the network connections that the system provides.

In the example of FIG. 1, the gateway 110 includes a transmitter subsystem 112 and a receiver subsystem 114, as well as a status monitoring system 116. The transmitter subsystem 112 and the receiver subsystem 114 may be configured to use frequencies in different bands of the electromagnetic spectrum. For example, the transmitter subsystem 112 used for uplink to the satellite 120 can transmit data in multiple channels in the V band. The receiver subsystem 114 may be configured to receive data transmitted in channels in the Q band. This may be reversed if desired (e.g., transmit in the Q band, receive in the V band). Of course, the gateway 110 may optionally be configured to transmit and receive in the same band or bands also (e.g., transmit and receive in the Q band, transmit and receive in the V band, transmit and receive in the Ka band, etc.). More generally, the gateway 110 can be designed to operate (e.g., transmit and/or receive) in the extremely high frequency (EHF) range designation of the International Telecommunication Union (ITU), and in the Ka band (26.5-40 GHZ) and/or V band (40-75 GHz) defined by the Institute of Electrical and Electronics Engineers (IEEE), and/or the Q band (e.g., 36-46 GHZ) defined by the International Organization for Standardization (ISO).

The intermediate frequencies used by the gateway 110 are often in the L band (e.g., 1-2 GHz) and S band (e.g., 2-4 GHZ), and frequencies in the C band (e.g., 4-8 GHZ) may also be used.

Various configurations of the transmitter subsystem 112 and receiver subsystem 114 are described with respect to the subsequent figures. The gateway 110 can be configured to communicate with a satellite 120 in low earth orbit (LEO) (e.g., having an orbital period of about 128 minutes or less), in medium earth orbit (MEO) (e.g., a period of about 128 minutes to 24 hours), or in a higher orbit.

As discussed further below, the gateway 110 and the satellite 120 can be configured to communicate using multiple radiofrequency channels. For example, multiple channels that each have a predetermined bandwidth (e.g., 500 MHZ) can be defined for uplink and for downlink. The frequency channels defined for uplink communication can be different from and non-overlapping with the frequency channels defined for downlink communication. For example, uplink and downlink use separate frequency ranges, and can be separated by a predetermined amount of bandwidth, such as 0.5 GHZ, 1 GHZ, 2 GHZ, 3 GHZ, etc. In some implementations, the uplink and downlink channels are separated by at least 4 GHz. For example, the lower end of the frequency range for the set of downlink channels can begin at least 4 GHz above the upper end of the frequency range for the set of uplink channels. This is only optional, however, and any appropriate non-overlapping frequency ranges can be set for uplink and downlink, with any appropriate level of separation between the ranges.

The gateway 110 can be configured to receive data in a total bandwidth (e.g., across all downlink channels) of at least 3 GHZ, and in many cases a larger bandwidth (e.g., at least 4 GHZ, 4.5 GHz, 5 GHZ, 5.5 GHZ, etc.). Using 5 GHz of reception bandwidth, the gateway 110 can provide ten 500

MHz channels for reception for each polarization (e.g., 10 RHCP downlink channels and 10 LHCP downlink channels). Other channel bandwidths may be used to split the overall reception bandwidth to provide more or fewer channels. For example, for the same 5 GHz of reception bandwidth, the gateway 110 can provide twenty 250 MHz channels per polarization or five 1.0 GHz channels per polarization.

The gateway 110 can be configured to transmit data in a total bandwidth (e.g., across all uplink channels) of at least 3 GHZ, and in many cases a larger bandwidth (e.g., at least 4 GHZ, 4.5 GHZ, 5 GHZ, 5.5 GHZ, etc.). For example, using 4 GHz of transmission bandwidth, the gateway 110 can provide eight 500 MHz uplink channels per polarization (e.g., 8 RHCP uplink channels and 8 LHCP uplink channels). Of course, uplink channels can be defined with other bandwidths (e.g., 250 MHz, 1 GHZ, etc.) to split uplink bandwidth into more or fewer channels.

Figure 2:
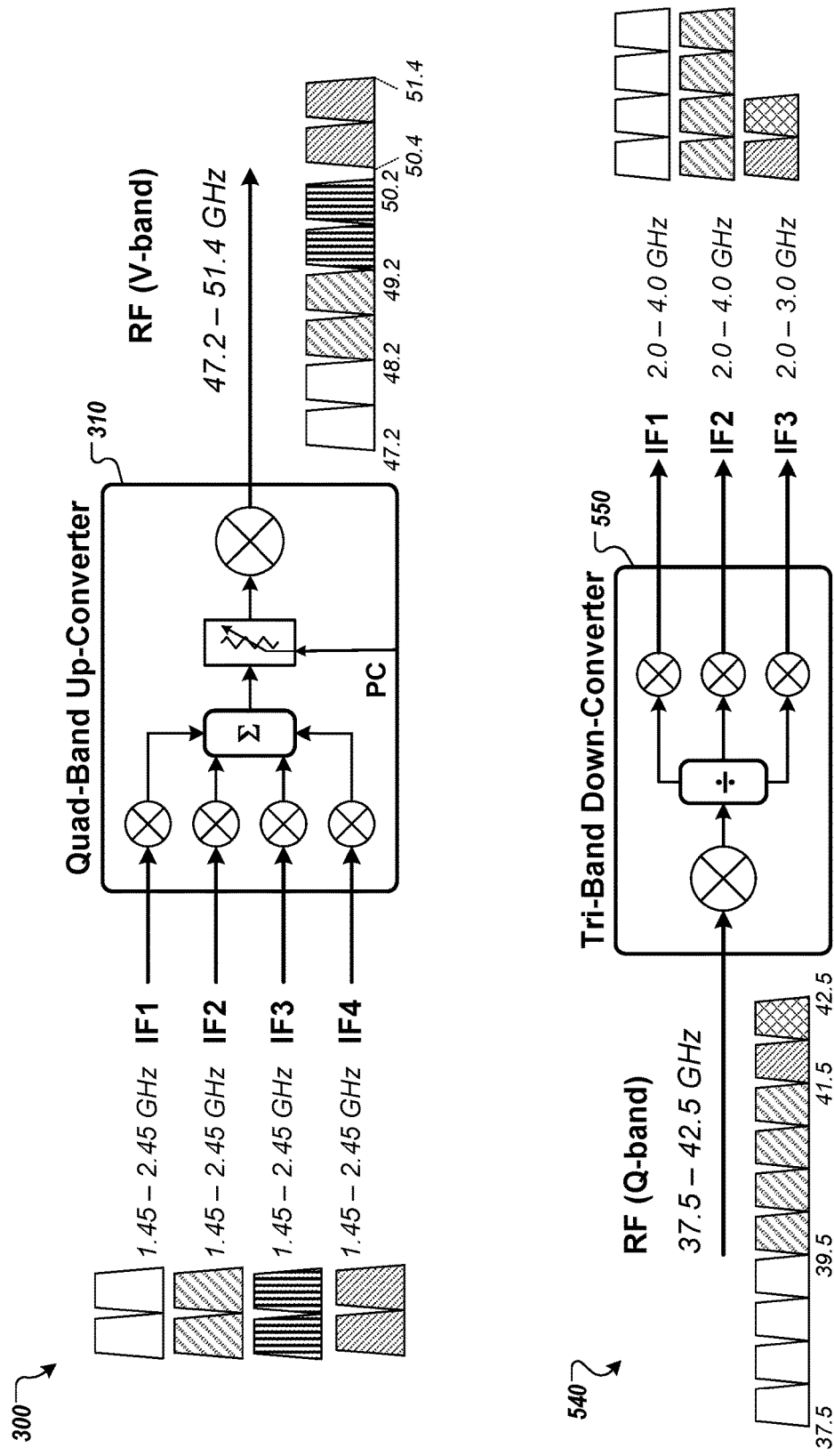
FIG. 2 is a diagram that illustrates example frequency plans for uplink and downlink for a satellite gateway of the satellite networking system.

FIG. 2 shows examples of frequency plans for uplink transmission and downlink transmission that can be used in the gateway 110, such as an uplink frequency plan 300 and a downlink frequency plan 540.

The transmitter subsystem 112 can use the uplink frequency plan 300, which provides eight 500 MHz uplink channels. Signals for pairs of uplink channels are transmitted together, so that there are four different intermediate frequency signals IF1-IF4 provided to a quad-band upconverter 310. Each of the four inputs to the upconverter 310 has a bandwidth of 1 GHZ, and in the example, each IF signal IF1-IF4 spans a frequency range from 1.45 GHz to 2.45 GHz. The upconverter 310 shifts the IF signals IF1-IF4 to different portions of the V band. In the example, the upconverted output is provided at a range of 47.2 GHz to 51.4 GHz. With this configuration, there are four interfacility links (IFLs) that are active for each polarization used for transmission (e.g., one IFL for each of the intermediate frequencies IF1-IF4 for RCHP transmission, and one IFL for each of the intermediate frequencies IF1-IF4 for LHCP transmission). Each IFL carries 1.0 GHz of bandwidth. In some implementations, there are also for standby IFLs that can be switched to in the event of a failure for one of the primary IFLs. This configuration can provide a very small footprint for the transmitter subsystem components, such as providing all of the modulators in a single unit of rack space footprint.

The gateway 110 can use the uplink frequency plan 300 (or other uplink frequency plans discussed below) for multiple polarizations concurrently. For example, the frequency plan 300 can be used to transmit right hand circular polarized (RHCP) signals, and the same frequency plan 300 can also be used to concurrently transmit left-hand polarized (LHCP) signals using the same channel definitions and intermediate frequency ranges.

In the example of FIG. 2, the receiver subsystem 114 uses a downlink frequency plan 540. This involves receiving radiofrequency (RF) input in the Q band. For example, the receiver subsystem 114 can receive signals in a range from 37.5 GHz to 42.5 GHz. The RF input is provided to a tri-band downconverter 550, which down converts to three intermediate frequency outputs IF1-IF3. In this example, IF1 has a bandwidth of 2.0 GHZ, IF2 has a bandwidth of 2.0 GHz, and IF3 as a bandwidth of 1.0 GHz. IF1 and IF2 each include signals in the range from 2.0 GHz to 4.0 GHz, and IF3 as signals in the range from 2.0 GHz to 3.0 GHz.

The gateway 110 can use the downlink frequency plan 540 (or other downlink frequency plans discussed below) for multiple polarizations concurrently. For example, the frequency plan 540 can be used to receive right hand circular polarized (RHCP) signals, and the same frequency plan 540 can also be used to concurrently receive left-hand circular polarized (LHCP) signals using the same channel definitions and intermediate frequency ranges. In this configuration, there are nine IFLs, for example, three RHCP IFLs, three LHCP IFLs, and three standby IFLs that can be allocated or switched into use in place of the others in the event of a failure.

The frequency plans shown in FIG. 2 demonstrate how the gateway 110 can be configured to use an uplink frequency plan and a downlink frequency plan that have various different characteristics, such as differences in the number of bands, the intermediate frequencies used, and the band of the electromagnetic spectrum from which the RF signals are placed. Other variations are described below. For example, the gateway 110 can be configured to use any of the different uplink frequency plans 300, 350 (FIGS. 3A-3B) with any of the downlink frequency plans 500, 520, 540, 560 (FIGS. 5A-5D). Similarly, the gateway 110 can be configured to implement the transmitter subsystem 112 using any of the transmitter subsystems 400a-400f (FIGS. 4A-4F), and can be configured to implement the receiver subsystem 114 using any of the receiver subsystems 600a-600g (FIGS. 6A-6G).

Figure 3A:
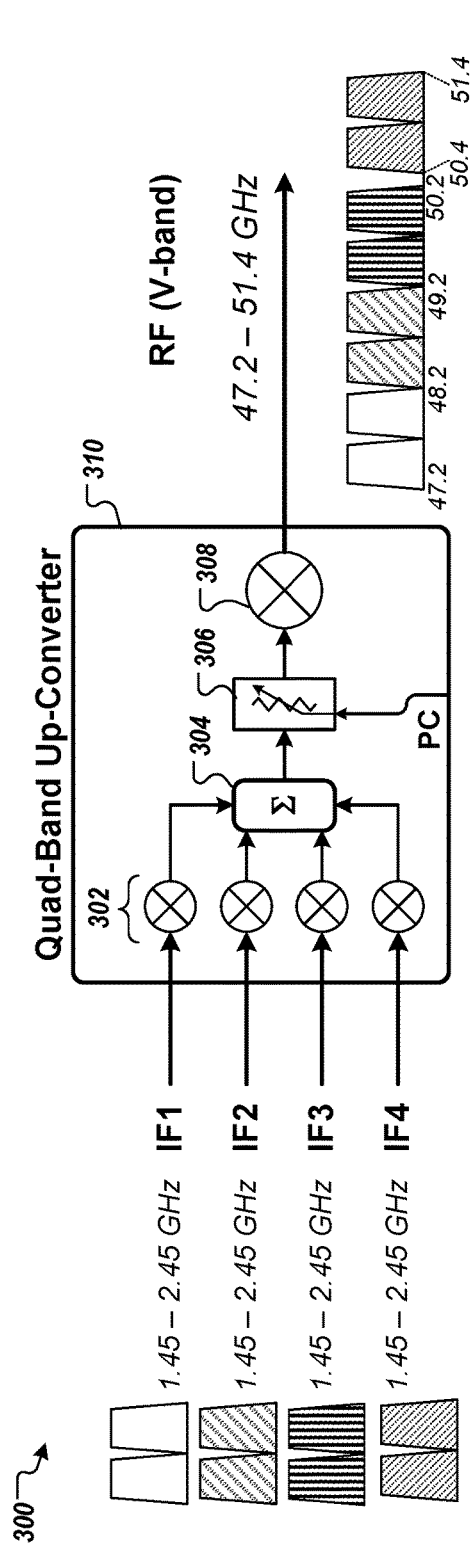
FIGS. 3A-3B are diagrams that illustrate various uplink frequency plans for the satellite gateway.
Figure 3B:
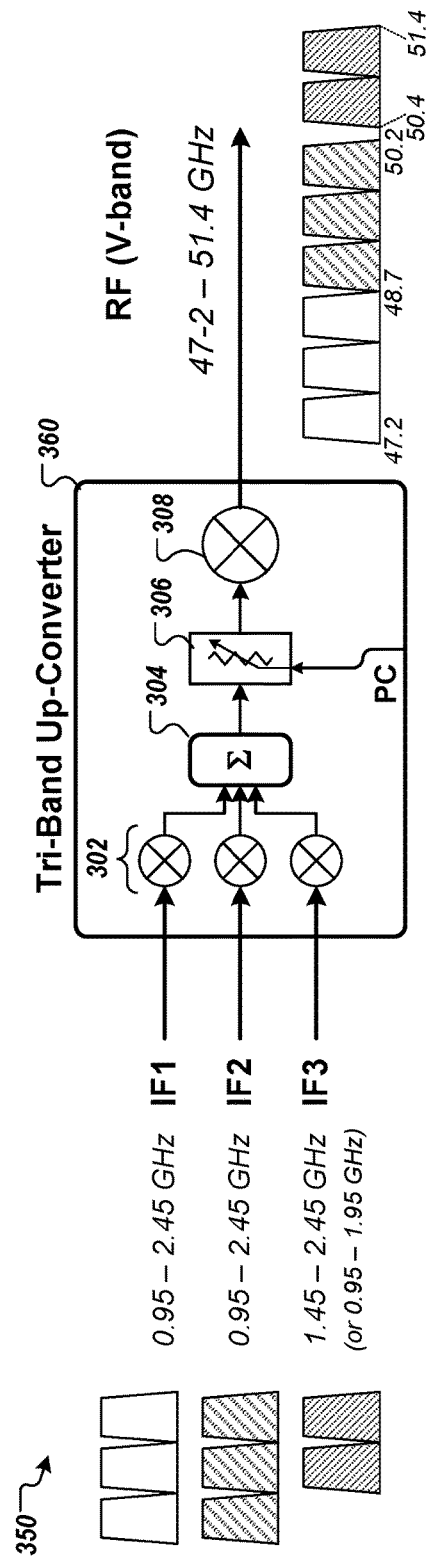

FIGS. 3A and 3B show different uplink frequency plans 300, 350 that can be used to implement upconverters in the transmitter subsystem 112 of the gateway 110. Either of the uplink frequency plans 300, 350 can be used to implement the transmitter subsystem 112 for uplink communication with the satellite 120.

FIG. 3A shows an uplink frequency plan 300 in which signals to be transmitted are provided in four separate inputs. This results in four IFLs per polarization. The signals transmitted on each IFL have a 1.0 GHz bandwidth, each having signals to be transmitted in an intermediate frequency range from 1.45 GHZ-2.45 GHz. As discussed above, the frequency plan 300 uses a quad-band upconverter 310, which provides up converted output in the V band. In this case, the output spans the range from 47.2 GHz to 51.4 GHz.

The quad-band upconverter 310 includes four mixers 302, one mixer for each input IFL. The mixers 302 each use different local oscillator signals to distribute the signals from the four different IFLs to adjacent, non-overlapping intermediate frequency regions. The results of the mixing are provided to a summing element 304, then adjusted with an adjustable game element 306 as well as other signal processing components (e.g., amplifiers, filters, gain slope compensation, temperature compensation, and other elements). The combined signal, as adjusted with the adjustable gain elements 306 (which labeled with "PC" to represent power control inputs) is then provided to the frequency mixer 308 which upconverts the signals up to the desired frequency range in the V band. The quad-band upconverter 310 can also include filters, amplifiers, compensation elements, and so on after the frequency mixer 308.

FIG. 3B shows an alternative uplink frequency plan 350, in which there are three IFLs per polarization providing input signals to be transmitted. The first two IFLs each carry IF signals that have a bandwidth of 1.5 GHZ (e.g., signals for three 500 MHz channels), in the frequency range from 0.95 GHz to 2.45 GHz. The third IFL receives input signals with the bandwidth of 1.0 GHZ, in a frequency range from 1.45 GHz to 2.45 GHz. As another option, the signals for IFL3 (e.g., signals for two 500 MHz channels) may be provided in a frequency range from 0.95 GHz to 1.95 GHz.

The frequency plan 350 uses a tri-band upconverter 360 that uses three mixers 302, and operates in a similar manner to the upconverter 310. For example, a summing element 304 combines the mixer output from the mixers 302, a gain adjustment element 306 or other components adjusts the signal further, and a final mixer 308 provides the signals in the desired range, for example, from 47.2 GHz to 51.4 GHz.

FIGS. 4A-4F show different example transmitter subsystems 400a-400f that can be used to implement the transmitter subsystem 112 of the satellite gateway 110. Each example includes a network switch 402, modulators 410, an intermediate frequency distribution network 420, upconverters 430, amplifiers 440, radio frequency switches 450, and a spectrum monitoring module 460. The function of the network switch 402, amplifiers 440, radiofrequency switches 450, and spectrum monitoring module 460 are generally consistent across the various examples.

The modulators 410, IF distribution network 420, and upconverters 430 can have different configurations or different sets of features that vary from one example to the next. For example, different types of modulators 410 are labeled as modulators 410a-410f, different types of IF distribution networks 420 are labeled as IF distribution networks 420a-420f, and different types of upconverters 430 are labeled as upconverters 430a-430f.

In the example, each switch 450 is a 4-port device, with two input ports and two output ports, sometimes referred to as a "baseball switch." This type of switch is configured with four radiofrequency paths. For example, each switch 450 can be a transfer relay that has two independent RF input paths that are transferred simultaneously between the two output ports when switching occurs. This device has two states: (1) a first state in which input port 1 is coupled to output port 1 and input port 2 is coupled to output port 2, and (2) a second state in which input port 1 is connected to output port 2 and input port 2 is coupled to output port 1. The switching action is similar to a dual-pole double throw (DPDT) switch, except the two output ports are commonly shared with each input port (e.g., rather than each input port having a separate pair of output ports, the devices switches between only two output ports). Each switch 450 can configured as a relay or other electrically-actuated device to enable the controller to control the state of each switch 450 electrically.

Figure 4A:
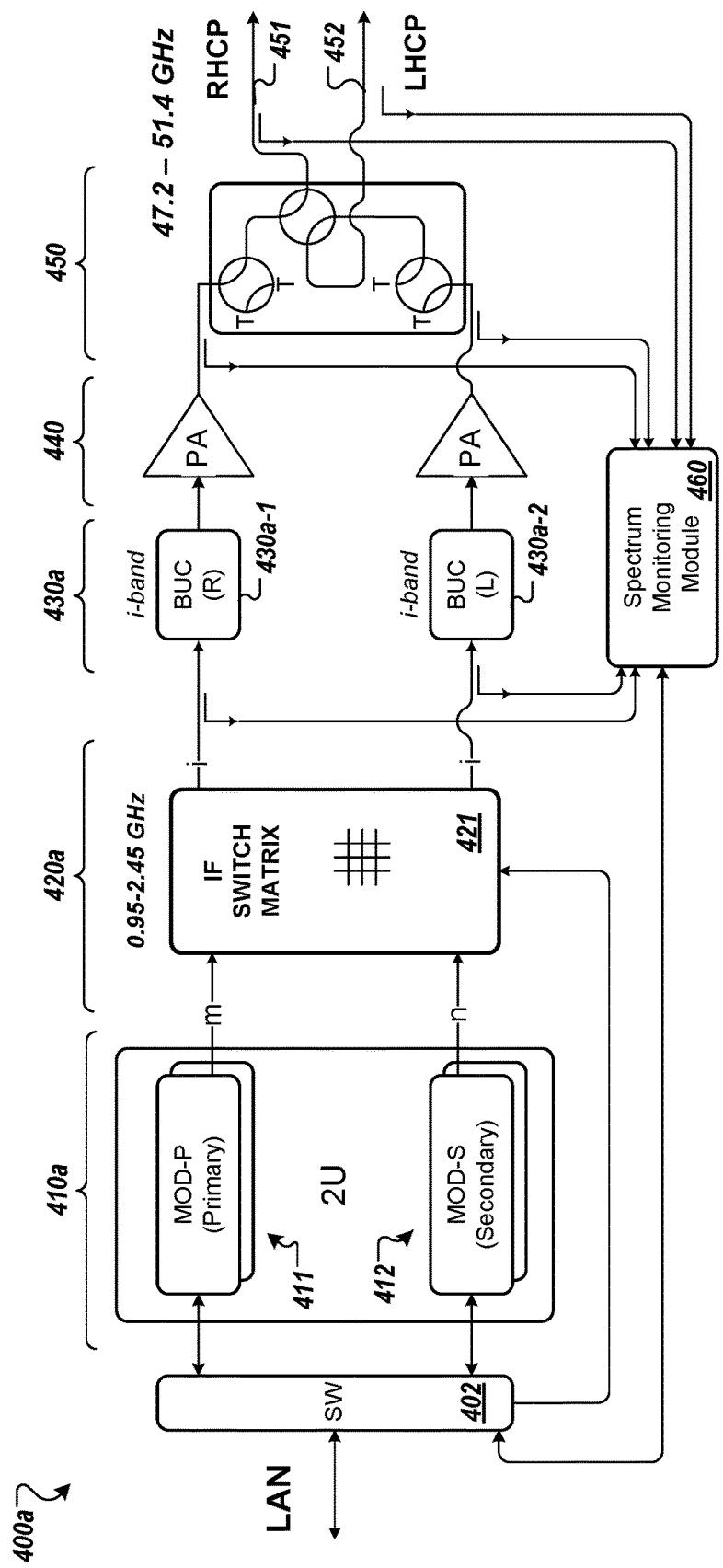
FIGS. 4A-4F are diagrams that illustrate various example transmitter subsystems for the satellite gateway.

FIG. 4A shows an example configuration for a transmitter subsystem 112 that can be used to provide various different amounts of bands or channels, as well as different levels of redundancy. Either of the frequency plans 300, 350 of FIGS. 3A and 3B can be used with the example of FIG. 4A. In the example, there are several different variables that can be set in the system, including variables m, n, and i. The variable i represents an integer number of bands that each block converter is configured to process. For example, the value of i may be 4 when using the frequency plan 300, or may be three when using the frequency plan 350. The values of m and n represent the number of modulator outputs in each of two groups 411, 412 of modulators 410a.

In FIG. 4A, a transmitter subsystem 400a receives data from a LAN to transmit using the connection with the satellite 120. The received data is processed by a network switch 402 and potentially other packet processing hardware. The network switch 402 divides the data to be transmitted among the various uplink channels and routes the digital data to the appropriate modulators 410a. The modulators 410a are shown in two groups. A primary group 411 is designated to handle modulation for RHCP transmission and for LHCP transmission. There are m modulator output lines providing intermediate frequency outputs to the IF distribution network 420a. For example, with each polarization having i different bands or IFLs, the value of m can be 2i. In other words, when using tri-band upconverters (e.g., i=3), the value of m can be six (e.g., m=3×2=6).

A secondary group 412 of modulators 410a is placed in standby mode, providing redundant modulator capacity that is ready to be used in the event of a failure on one of the modulators 410a in the primary group 411. For the primary modulators 410a, there are m different modulator output lines or ports, and for the secondary modulators 410a there are n output lines or ports. The ratio between m and n indicates the level of redundancy among the modulators 410a. In some cases, m and n may be the same, and a ratio of 1:1 provides the same amount of standby or reserve capacity equal to the number of primary modulators. The outputs of the modulators 410a are intermediate frequency signals having the data for transmission modulated onto the various channels defined for uplink, with different data to be transmitted modulated for the respective bands used in the frequency plan. For example, if the uplink frequency plan 300 is being used for transmission, there will be four primary outputs for each polarization, with each output including modulated signals in the intermediate frequency range of 1.45 GHz to 2.45 GHz (e.g., for two 500 MHz channels).

Modulated output signals from the modulators 410 are provided to the IF distribution network 420A, which in this example is an intermediate frequency IF switch matrix 421. The switch matrix 421 has two sets of outputs, each carrying i number of separate connectors. For example, with the frequency plan 300, there will be i=4 signals transmitted for the RHCP section and also i=4 signals transmitted for the LHCP section. The switch matrix 421 has the capability to route each of the outputs of the primary modulators in the group 411 to either of the upconverters 430a. Similarly, the switch matrix 421 has the capability to route each of the outputs of the secondary modulators in the group 412 to either of the upconverters 430a. As a result, the switch matrix 421 can selectively connect any output of a modulator 410a with at least one input of the first upconverter 430a-1 or at least one input of the second upconverter 430a-2. The switch matrix 421 can additionally be capable of connecting each modulator output line to a termination that is not provided to any input of an upconverter 430a.

Thus, any of the inputs to the switch matrix 421 can be routed to either upconverter 430a, even across the different polarizations. In other words, any of the modulator outputs, whether in the group for RHCP or LHCP, can be switched to be part of any of the two sets of i outputs to different upconverters 430a. This switching can be provided for modulators 410a in the standby or secondary group 412 as well as for the modulators 410a in the primary group 411. For example, if one-to-one redundancy is desired for both polarizations, there may be eight primary modulator outputs (e.g., m=8) and a corresponding eight secondary modulator outputs (e.g., n=8), for a total of 16 inputs to the switch matrix 421. In this scenario, i equals 4, and there are a total of eight outputs of the switch matrix 421. For each of the eight modulator outputs, the switch matrix 421 can be set to provide the modulator output to an input port of either of the two upconverters 430a.

In some implementations, the switch matrix 421 is arranged to be able to route any of the modulator outputs to any of the upconverter inputs. For example, when i=4, m=8, and n=8, the switch matrix 421 can be arranged so that any of the 16 modulator outputs provided as input to the switch matrix 421 can be routed to any of the eight outputs of the switch matrix 421. This provides a great deal of versatility and handling modulator signals and dealing with any potential failures in the modulators 410a.

Output of the distribution network 420a is provided to the upconverters 430a (labeled "BUC" for block upconverter). Each of these upconverters 430A can be one of the upconverters 310 or 360, according to the frequency plan 300, 350 selected to be used. As discussed above, the upconverters 430a accept multiple intermediate frequency signals on different IFLs, with each IFL carrying data for one or more channels. The upconverters 430a each up-convert the signals on different IFS to different portions of the V band.

The output of each upconverter 430a, containing the upconverted signals for each of the multiple inputs to the upconverter 430a, are then amplified using one of the amplifiers 440.

Output from the amplifiers 440 is then provided to a set of radiofrequency switches 450. The switches 450 are arranged so that either of the amplifier outputs can be provided to either of the antenna feeds 451 or 452 or can be connected to a termination instead. This provides additional flexibility to transmit the output of either amplifier on either antenna feed 451, 452 or neither of them.

The transmitter subsystem 400a can include a spectrum monitoring module 460 that receives signals at multiple points from taps or ports. These monitored points can include each of the connections to the upconverters 430a so that the intermediate frequency signals output from the IF switch matrix 421 are monitored. In addition, the module 460 can receive outputs from each of the amplifiers 440, as well as signals provided on each of the antenna feeds 451 and 452.

The spectrum monitoring module also includes a connection 461 for sending control signals and receiving status information from the switch 402 or other network traffic processing hardware. For example, based on the characteristics of signals on one of the input lines to the upconverters 430A, the module 460 may determine that signals on one of the lines are abnormal or absent. From this, the module 460 can determine that a failure has occurred in one of the modulators 410 or that the switch matrix 421 is not providing the correct output. The module 460 can store the data indicating the state of the switch matrix 421 and/or the settings of the switch matrix 421 can be retrieved through a data and control connection 462. With this information, the spectrum monitoring module 460 can identify which modulator and/or switching path is resulting in the abnormal or absent signals that were detected. The spectrum monitoring module 460 can provide information about the status of monitored lines to an external control system over the LAN.

The module 460, or another external monitoring system, can also instruct the network switch 402, modulators 410a, and distribution network 420a to route data for transmission to, and modulate using that data with, a different modulator 410a. The instructions also can change the switch matrix settings so that the newly selected modulator 410a has its output transmitted to the appropriate switch matrix output line on which the problem was detected. The other signals monitored by the module 460 can be used to verify proper operation of the rest of the transmitter subsystem 400a. The module 460, or an external control system, can also include a control connection with the switches 450 to be able to change the settings to route the different power amplifier 440 outputs to the appropriate antenna feed 451, 452 or to a termination (labeled "T").

Figure 4B:
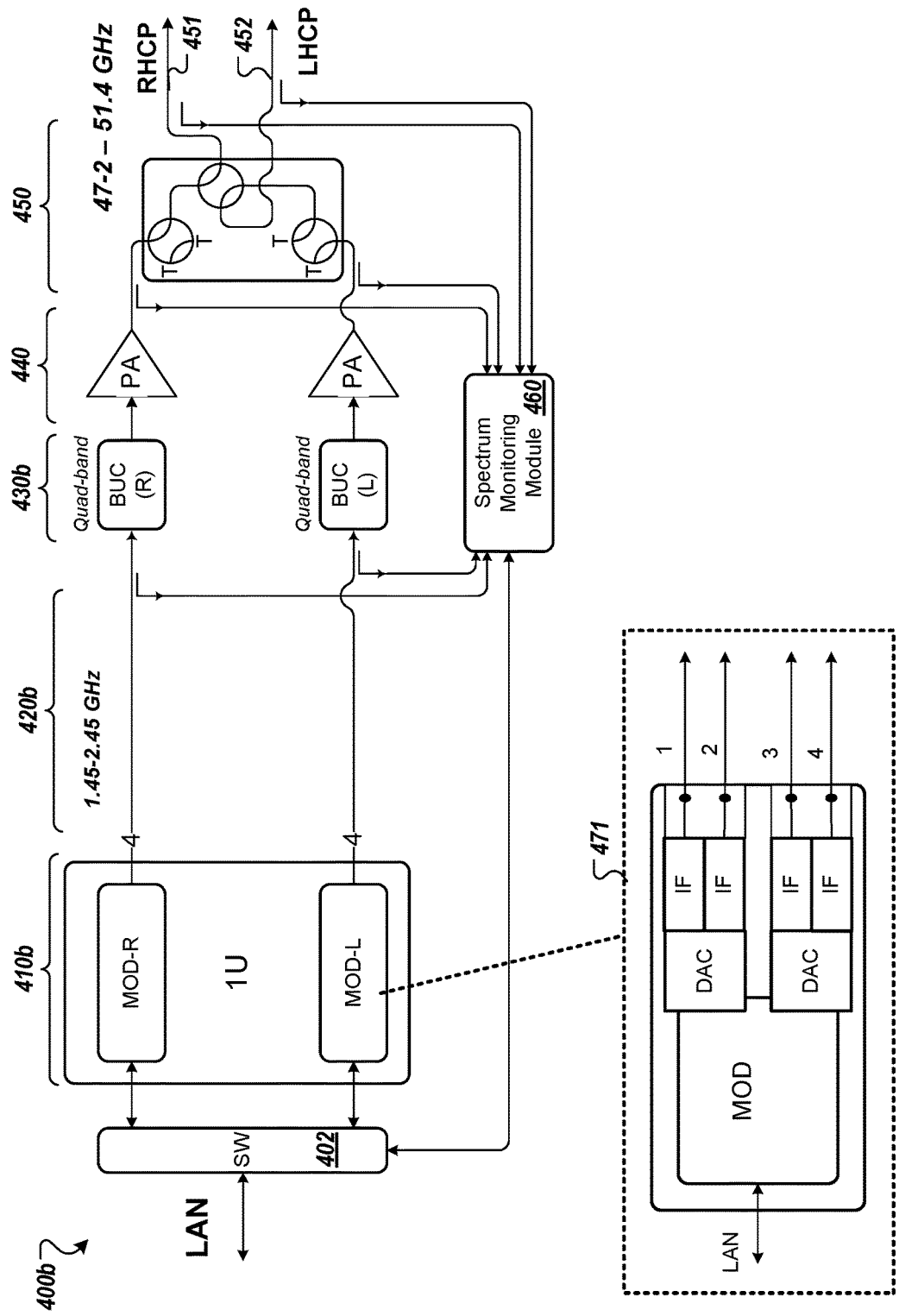

FIG. 4B shows another example transmitter subsystem 400b that can be used in the transmitter subsystem 112. This example uses quad-band upconverters 430b and an IF distribution network 420b that provides a direct connection between outputs of the modulators 410b and the upconverters 430b (e.g., without switching elements that would alter the coupling of modulator outputs to upconverter inputs).

In further detail, there is one modulator 410b for each of two polarizations, e.g., one modulator for data to be transmitted using RHCP (e.g., MOD-R) and one modulator for data to be transmitted using LHCP (e.g., MOD-L). This results in four output lines per modulator 410b, with each output line carrying a different intermediate frequency signal. The output lines of each modulator 410b are provided to inputs of a corresponding upconverter 430b.

Each modulator 410b can be implemented as indicated as element 471, with four outputs, each providing two channels of modulated data at a desired intermediate frequency (e.g., IF signals in the range from 1.45 GHz to 2.45 GHz, thus carrying signals for two 500 MHz uplink channels). The example shows how a modulator 410b can include multiple digital-to-analog converters (DACs) which are used to produce multiple intermediate frequency output signals (e.g., four for each modulator 410b). The amplifiers 440, switches 450, and spectrum monitoring module 460 operate as described above for FIG. 4A, except that without any switch matrix the monitoring module 460 does not need to read settings from or alter settings from components in the IF distribution network 420b.

Figure 4C:
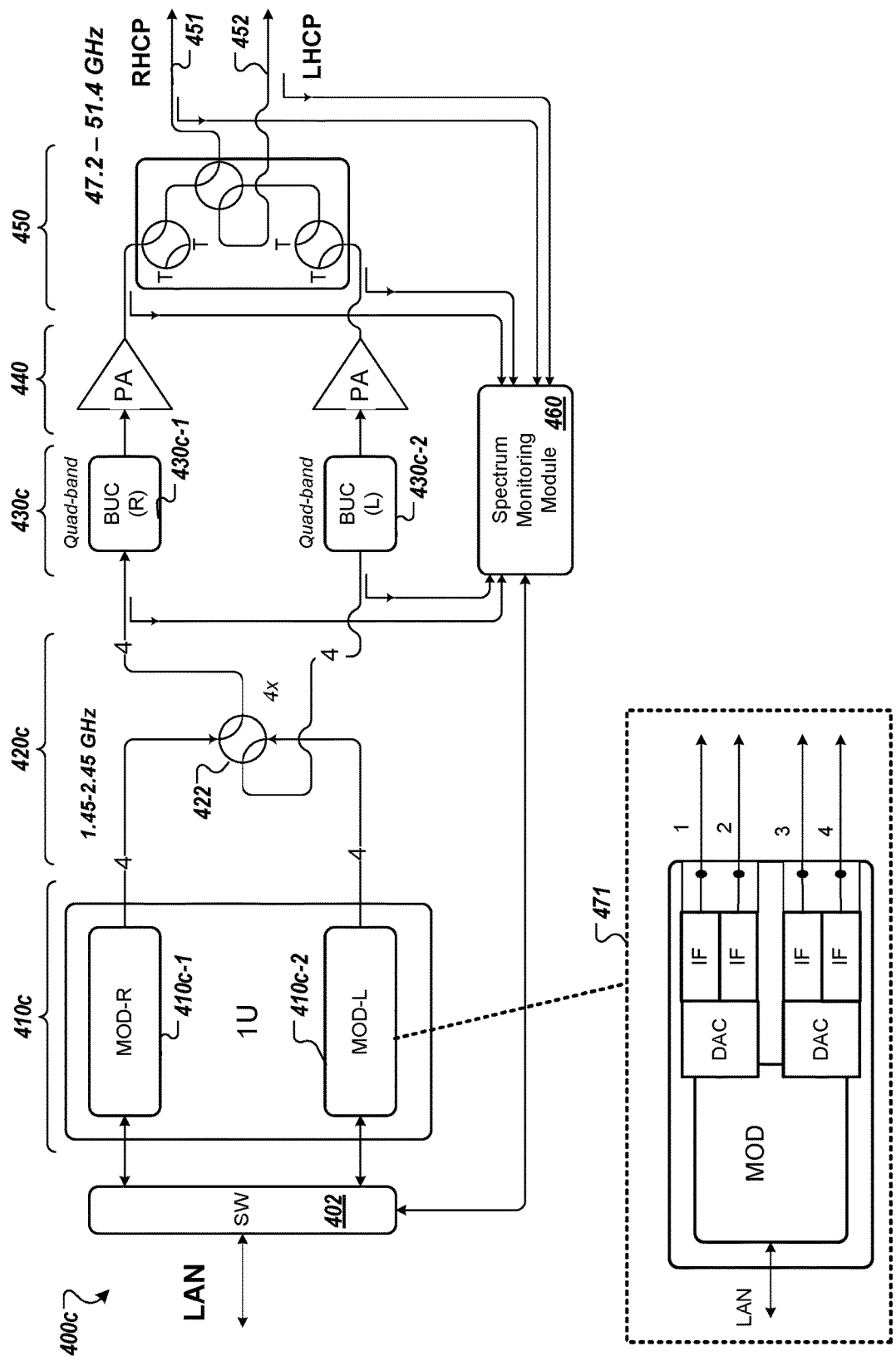

FIG. 4C shows another example transmitter subsystem 400c, which is similar to the transmitter subsystem 400b of FIG. 4B, but the IF distribution network 420c adds switching capability not present in the distribution network 420b. In particular, between the modulators 410c and the upconverters 430c, there are four switches 422, configured to work at the intermediate frequency range of 1.45 GHz to 2.45 GHZ, that can switch outputs of the different modulators 410c between the different upconverters 430c. For example, a switch 422 can be coupled to receive input for the first IFL of the RHCP modulator 410c-1 and input of the first IFL of the LHCP modulator 410c-2. The switch 422 can set whether (1) the RHCP first IFL is provided to the RCHP upconverter 430c-1 and the LHCP first IFL is provided to the LHCP upconverter 430c-2, or (2) cross-switching occurs so that the RHCP first IFL is provided to the LHCP upconverter 430a-2 and the LHCP first IFL is provided to the RHCP upconverter 430a-1.

The switches 422 provide the option for cross-switching, which can achieve improved availability during a double failure. For example, if one of the modulators 410c experiences a failure and one of the upconverters 430c or amplifiers 440 also experiences a failure, the spectrum monitoring module 460 can route signals from the functioning modulator 410c to the functioning upconverter 430c and amplifier 440. The output from that amplifier 440 can then be routed to either of the antenna feeds 451, 452 using an appropriate setting for the switches 450.

Figure 4D:
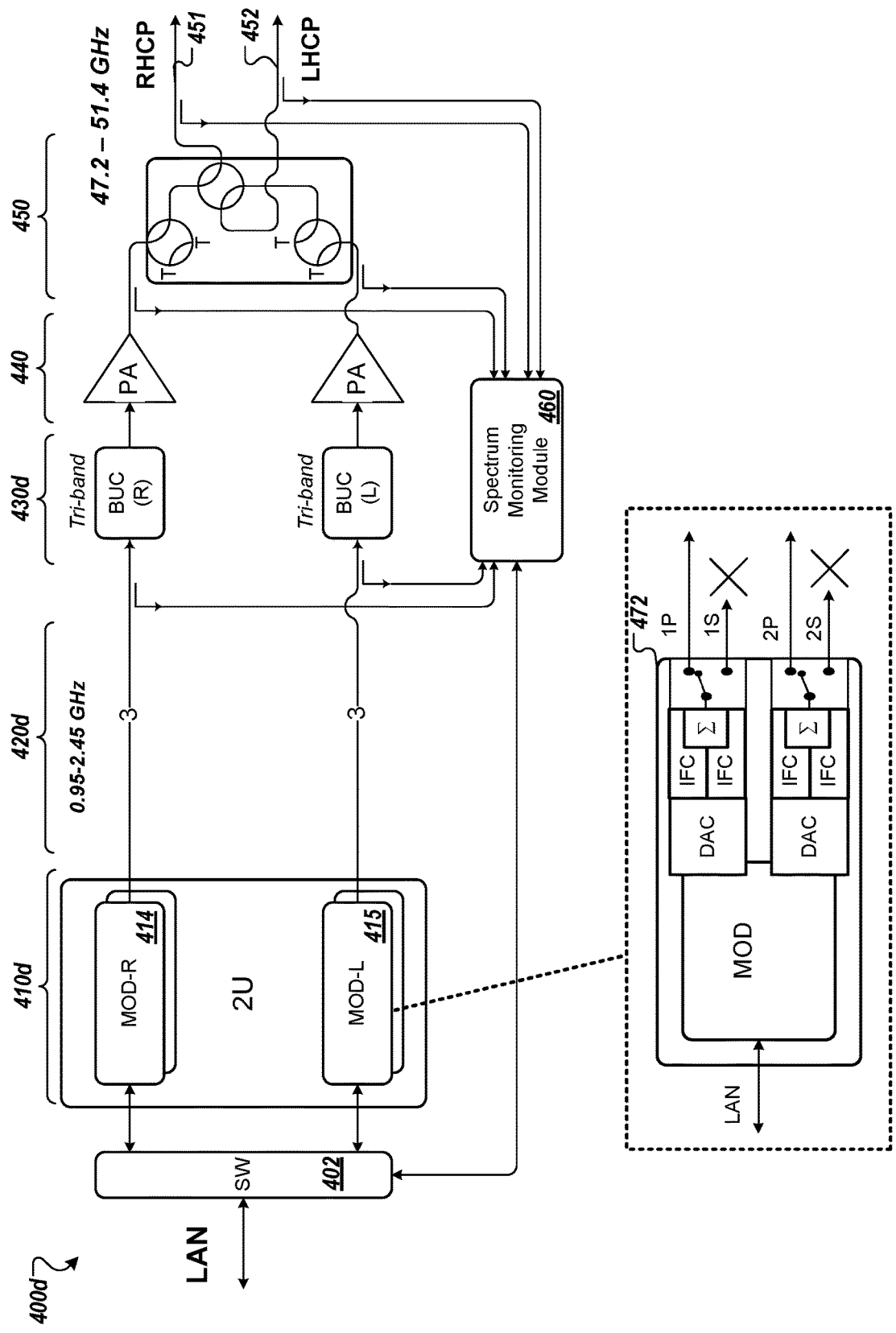

FIG. 4D shows another example of a transmitter subsystem 400d. In this example, modulators 410d providing three intermediate frequency outputs are used, and tri-band upconverters 430d are used, according to the frequency plan 350. The transmitter subsystem 400d is similar to that of 400b, in that the IF distribution network 420d provides direct connections between modulators 410c and upconverters 430d without switching elements between them.

The modulators 410d can each be implemented as illustrated as shown for modulator 472 to include multiple intermediate frequency generating components. For example, a modulator ("MOD") can be coupled with two digital-to-analog converters ("DACs"), and each DAC can be coupled to two intermediate frequency generating components ("IFCs") The outputs of pairs of IFCs that generate output in different frequency ranges can be summed together with a summing element ("E"). The summed output is provided to one of two output lines, as selected by a switch. For example, the top DAC is used to generate modulated output for two ranges of intermediate frequency output that can be summed together. Then, using a switch, the summed output can be provided to either a primary output ("1P") or, if desired, provided instead to a secondary or standby output ("1S"). In the example of FIG. 4D, however, the switches of the modulators 410d are not used, and the secondary outputs, e.g., 1S and 2S, are not connected or used. Instead, for RHCP channels, there are two modulators 410d and only the 1P and 2P outputs of the first RHCP modulator 410d are used and only the IP output of the second RHCP modulator 410d is used, for a total of three IFLs or output lines for RHCP signals routed to the RHCP upconverter 430d. Similarly, there are only three IFLS or output lines from the LHCP signals routed to the LHCP upconverter 430d.

Figure 4E:
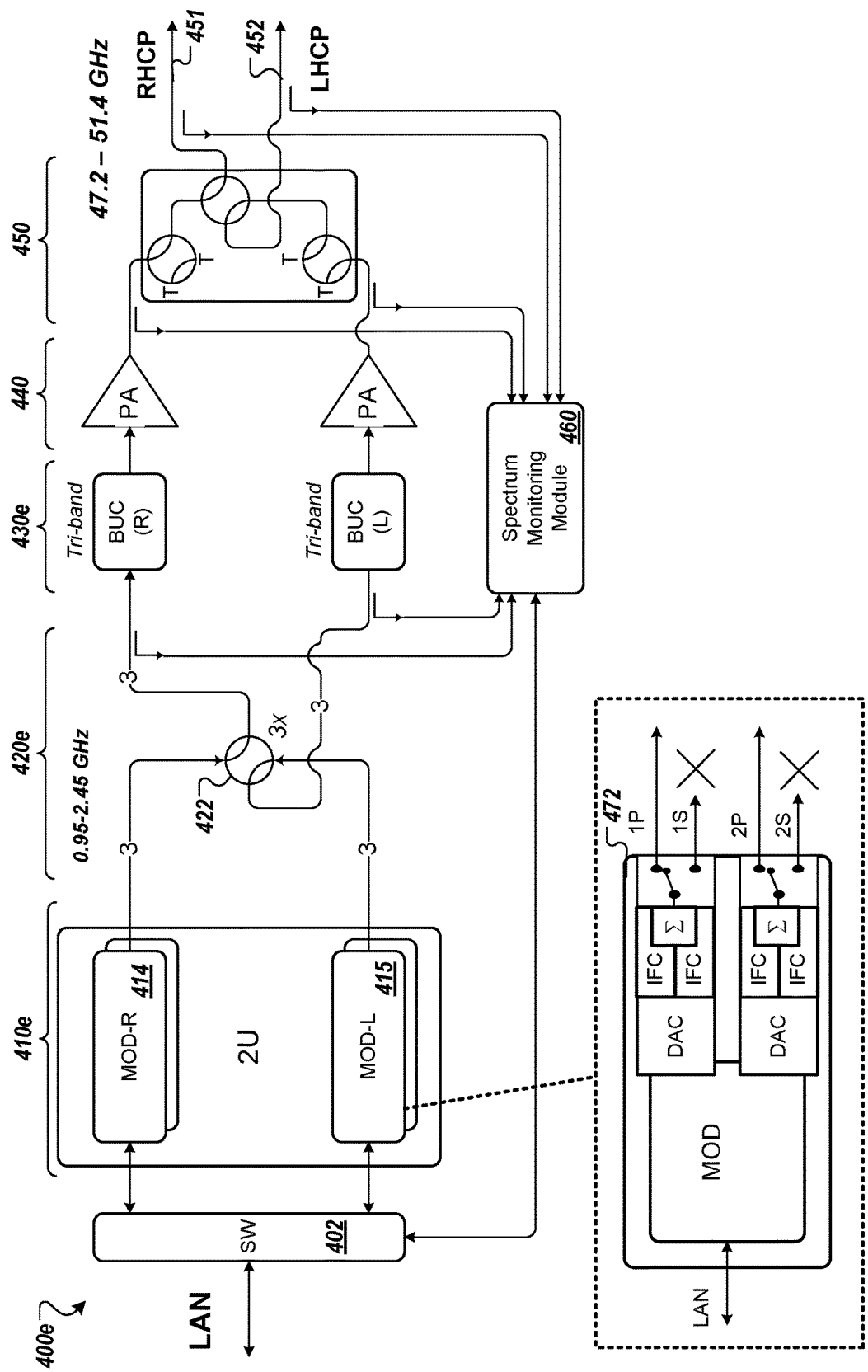

FIG. 4E shows an example transmitter subsystem 400e that has features as described for the transmitter subsystem 400d of FIG. 4D, but adds switches 422 in the IF distribution network 420e. These switches 422 allow routing of modulator outputs from either the group 414 of RHCP modulators or the group 415 of LHCP modulators to either of the upconverters 430e As discussed for receiver subsystem 400d, the modulators 410e include switches that can switch between primary outputs (labeled 1P and 2P) and secondary outputs (labeled 1S and 2S). However, the switches of the modulators 410d are not used, and the secondary outputs, e.g., 1S and 2S, are not connected or used.

Figure 4F:
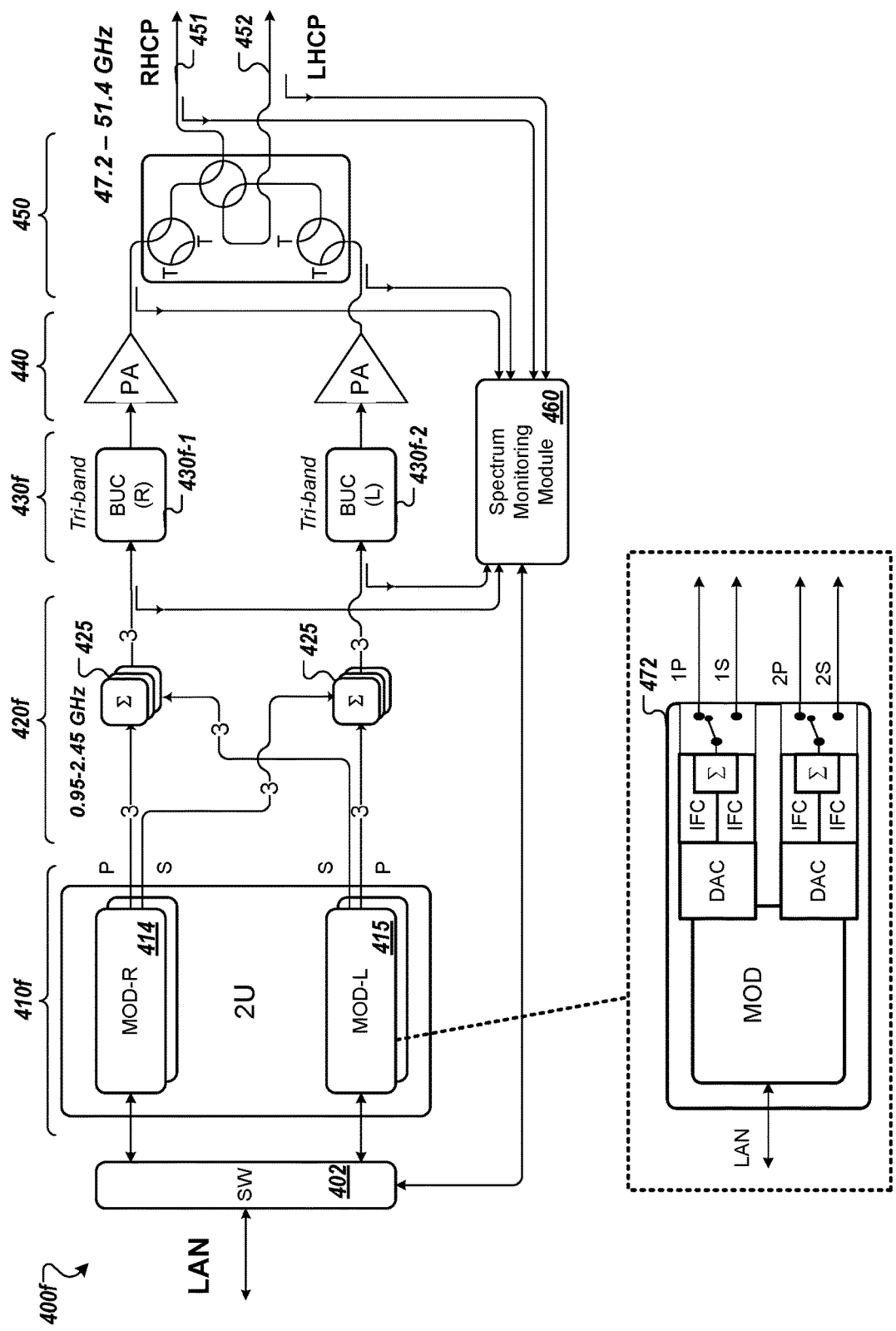

FIG. 4F shows another example transmitter subsystem 400f. This example includes tri-band upconverters 430f, of the type shown as upconverter 360 in FIG. 3B. The receiver subsystem 400f uses the uplink frequency plan 350 of FIG. 3B.

In the transmitter subsystem 400f, the modulators 410f have features as shown in modulator implementation 472. This includes switches that can switch between primary outputs (e.g., 1P and 2P) and secondary outputs (e.g., 1S and 2S). Three primary modulator outputs can be provided for each polarization (e.g., 1P and 2P for a first modulator and IP of a second modulator). Three secondary modulator outputs can be provided for each polarization (e.g., 1S and 2S for a first modulator and 1S of a second modulator). This results in three primary IF outputs for RHCP, three standby output lines for RHCP, three primary outputs for LHCP, and three secondary outputs for LHCP, for a total of 12 IFLs or output lines.

The IF distribution network 420f provides passive distribution of modulator outputs from RCHP modulator group 414 to both upconverters 430f and passive distribution of modulator outputs from LCHP modulator group 415 to both upconverters 430f. Modulator output lines are coupled to summing elements 425 in the IF distribution network 420f. This provides a combination of the primary RHCP outputs with the secondary LHCP outputs. In addition, the summing elements 425 combine the primary LHCP outputs with the secondary RHCP outputs. Using the switches shown in the modulator implementation 472, the system can select to provide modulated output signals over (1) primary IFLs (e.g., the "P" lines, including 1P, 2P, etc.), or (2) secondary IFLs (e.g., the "L" lines, including 1S, 2S, etc.). The summing elements 425 combine the modulated signals of pairs of IFLs across modulator groups 414, 415. For example, a first RHCP primary output 1P is summed with a first LHCP secondary output 1S; a first LHCP primary output 1P is summed with a first RHCP secondary output 1S; and so on. When switches are set to use primary outputs, the secondary outputs are not connected, so the provided on the primary IFLs reach the corresponding upconverters 430f. When the switches are set to provide output on the secondary output lines, there is no output on the primary lines, and cross-switching occurs (e.g., output from LHCP modulators 415 is provided to the RHCP upconverter 430f-1, and output from the RHCP modulators 414 is provided to the LCHP upconverter 430f-2. In this manner, the distribution network 420f can route signals from either or both groups 414, 415 of modulators 410f to either of the upconverters 430f, without any switching in the distribution network 420f.

The arrangement of transmitter subsystem 400f provides improved availability during a double failure, such as a failure in one or more modulators 410f and a failure in one or more upconverters 430f and/or amplifiers 440. The arrangement involves no external switches, only passive combining of the different modulator outputs, and each modulator 410f selects which output ports to use, from among the primary (P) and secondary(S) output ports.

FIGS. 5A-5D show different options of downlink frequency plans 500, 520, 540, 560 for the receiver subsystem 114. FIGS. 5A-5C each involve three bands (e.g., three different intermediate frequency outputs carrying different data) and use a tri-band downconverter. FIG. 5D involves four bands and uses a quad-band downconverter. FIGS. 5A and 5B each receive Q-band signals in a range from 37.5 GHz to 42.0 GHz, which can be divided into nine 500 MHz channel segments. FIGS. 5C and 5D receive Q-band signals in a range from 37.5 GHz to 42.5 GHz, which can be divided into ten 500 MHz channel segments.

FIG. 5A shows a downlink frequency plan 500, which makes use of a tri-band downconverter 510. The downconverter 510 includes a frequency mixer 502, a divider 504, and three mixers 506. The downconverter 510 is configured to receive Q-band signals in the range from 37.5 GHz to 42.0 GHz and to down convert these to three intermediate frequency outputs, labeled IF1-IF3. The outputs IF1 and IF2 are each in a range from 2.0 GHz to 4.0 GHz, thus having a bandwidth of 2 GHz each. The output IF3 is in a range from 2.0 GHz to 2.5 GHZ, for a bandwidth of 0.5 GHz.

The downlink frequency plan 500 can be used for multiple polarizations. For example, one tri-band downconverter 510 can be used for right hand polarized signals and another tri-band downconverter 510 can be used for left hand polarized signals. In addition, at least one additional downconverter can be provided as a redundant standby component that is able to take over for one of the other downconverters 510 in the event of a failure. With three downconverters 510 (e.g., RHCP, LHCP, and standby), this plan 500 would include 9 IFLs in total.

The example of FIG. 5A is optimized to limit the requirement of demodulator processing power and also the fewest number of demodulator is needed. It also can be implemented in the smallest footprint (e.g., physical space) of the four downlink frequency plan options in FIGS. 5A-5D.

FIG. 5B shows another example downlink frequency plan 520. This example also uses a tri-band downconverter 530. The downconverter 530 receives Q-band signals in the range from 37.5 GHz to 42.0 GHz and provides three intermediate frequency outputs IF1-IF3. In this example, each of the intermediate frequency outputs IF1-IF3 uses the same frequency range (e.g., 0.95 GHz to 2.45 GHZ) and bandwidth (e.g., 1.5 GHz).

The downlink frequency plan 520 can be used for multiple polarizations. For example, one tri-band downconverter 530 can be used for right hand polarized signals and another tri-band downconverter 530 can be used for left hand polarized signals. In addition, at least one additional downconverter can be provided as a redundant standby component that is able to take over for one of the other downconverters 530 in the event of a failure. With three downconverters 530 (e.g., for RHCP, LHCP, and standby), this frequency plan 540 would include 9 IFLs in total.

FIG. 5C shows another example downlink frequency plan 540. The example makes use of a tri-band downconverter 550 that receives Q band input signals in a range from 37.5 GHz to 42.5 GHz and produces output of three intermediate frequency outputs, IF1, IF2, IF3. In this example, the intermediate frequency outputs IF1 and IF2 are each in a range from 2.0 GHz to 4.0 GHz, thus having a bandwidth of 2.0 GHz each. The third intermediate frequency output IF3 is in a range from 2.0 GHz to 3.0 GHz for a bandwidth of 1.0 GHz.

The downlink frequency plan 540 can be used for multiple polarizations. For example, one tri-band downconverter 550 can be used for right hand polarized signals and another tri-band downconverter 550 can be used for LHCP signals. In addition, at least one additional downconverter can be provided as a redundant standby component that is able to take over for one of the other downconverters 550 in the event of a failure. With three downconverters 550 (e.g., RHCP, LHCP, and standby), this plan 540 would include 9 IFLs in total.

FIG. 5D shows another example downlink frequency plan 560. This example uses a quad-band downconverter 570. After the mixer 502, the mixer output is divided by divider 504 that splits the signal four ways. The downconverter 570 includes four mixers for a 6 to create four intermediate frequency outputs, labeled IF1-IF4. The downconverter 570 is configured to receive Q band input in the range from 37.5 GHz to 42.5 GHz. The first three intermediate frequency outputs IF1, IF2, IF3 are each in a frequency range of 0.95 GHz to 2.45 GHZ, each having a bandwidth of 1.5 GHz. The fourth intermediate frequency output IF4 has a frequency range of 0.95 GHz to 1.45 GHz, for a bandwidth of 0.5 GHz.

The downlink frequency plan 560 can be used for multiple polarizations as well as to provide a redundant standby capability. For example, one downconverter 570 can be used for RHCP signals, a second downconverter 570 can be used for LHCP signals, and a third downconverter 570 can be used as a redundant standby element. This results in four output lines per downconverter, for a total of 12 IFLs.

FIG. 6A to 6G show examples of different receiver subsystems 600a-600g that can be used in the receiver subsystem 114 of the gateway 110 of FIG. 1. The example of FIG. 6A can use any of various different types of downconverters, including tri-band downconverters, quad-band downconverters, 5-band downconverters, and so on. The examples of FIGS. 6B, 6D, 6F, and 6G use tri-band downconverters. The examples of FIGS. 6C and 6D use quad-band downconverters, such as the downconverter 570 from FIG. 5D.

Each of the receiver subsystems 600a-600g have certain general characteristics in common. For example, each receives signals in the Q band on an antenna feed 601 for RHCP signals and an antenna feed 602 for LHCP signals. The antenna feeds 601, 602 are provided to radiofrequency switches 610. These switches 610 can be 4-port devices, e.g., a baseball switch or transfer relay, as discussed above for the switches 450. Each switch 610 is connected so that it is able to selectively (1) route the received signal to a primary amplifier 620 and downconverter 630 for the corresponding polarization or (2) route the input to a standby low noise amplifier 620 and standby downconverter 630. In the receiver subsystems 600a-600g, there is one standby amplifier 620 and one standby downconverter 630 for the pair of polarizations. The standby components can be used in the event of a failure in either of the sets of primary components, but for only one polarization at a time. The output of each downconverter 630 includes multiple intermediate frequency signal outputs which are provided over an IF distribution network 640 to a set of demodulators 650. Output of the demodulators 650 is provided to a switch or other network packet processing hardware which then provides the received data over the LAN.

In the various receiver subsystems 600a-600g, the radiofrequency input in each case is in a range of 37.5 GHz to 42.5 GHz. Nevertheless, the different receiver subsystems 600a-600g vary in the number of bands used for the downconverters 630, in the types of distribution networks 640 that are used, and in the number and types of demodulators 650 that are used.

Figure 6A:
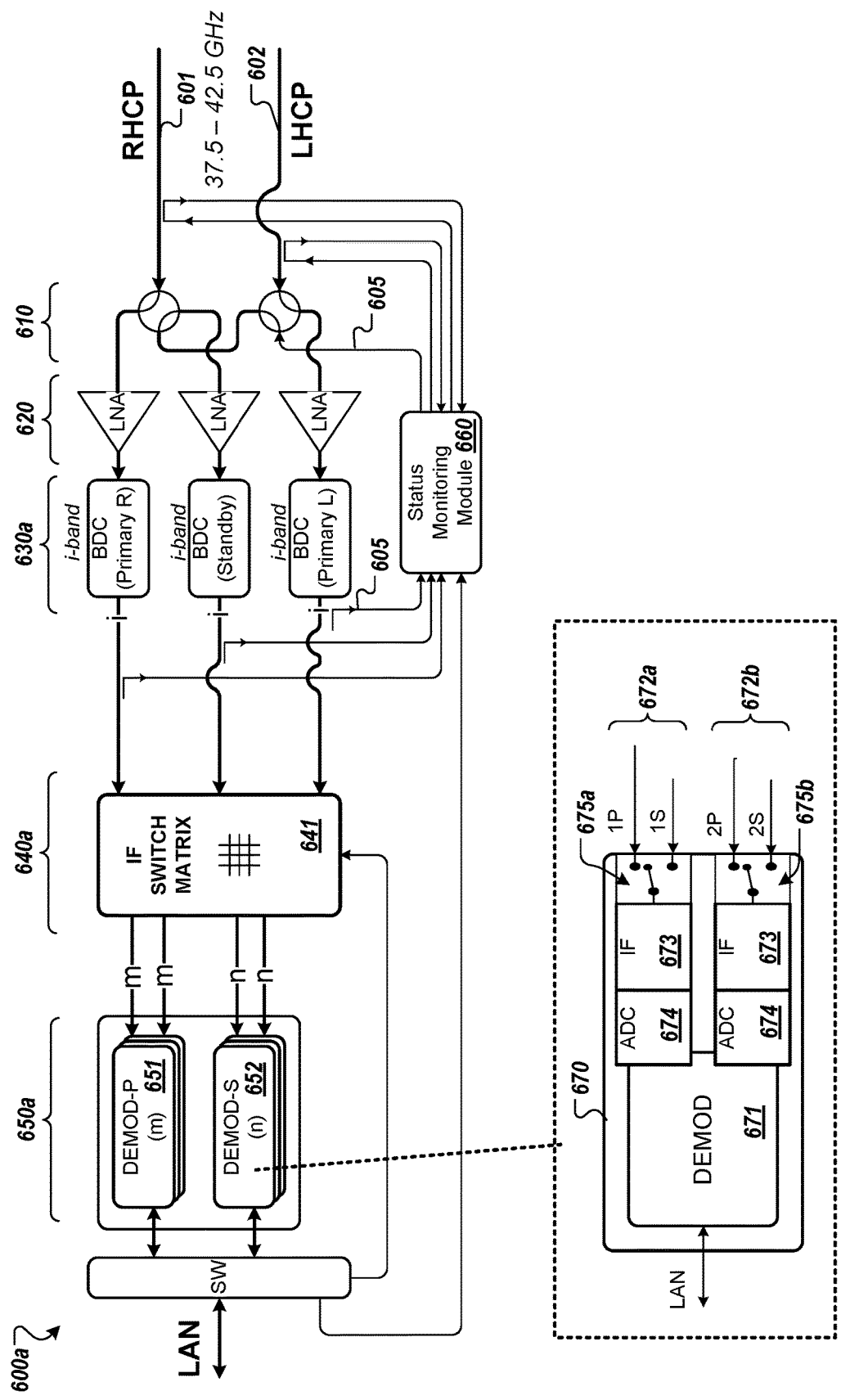
FIGS. 6A-6G are diagrams that illustrate various example transmitter subsystems for the satellite gateway.

FIG. 6A shows an example receiver subsystem 600a. Radiofrequency signals in the Q band as detected by the antenna are provided at antenna feeds 601 and 602. The antenna feed 601 carries RHCP signals, and the antenna feed 602 carries LHCP signals. The antenna feeds 601 and 602 are coupled to switches 610 which allow signals from each antenna feed 601, 602 to be routed to either of two low noise amplifiers 620. There are three low noise amplifiers 620 and three corresponding downconverters 620a. The top low noise amplifier 620 and downconverter 630a are the primary components for receiving RHCP signals, and the lower low noise amplifier 620 and downconverter 630a are the primary components for receiving LHCP signals. The middle low noise amplifier 620 and downconverter 630a are standby elements that normally remain in an operating standby mode without processing incoming signals when there are no failures on the primary components. However, in the event of a failure in either of the primary components, either the RHCP signals or the LHCP signals can be routed to the standby components. this provides redundancy and the ability to quickly recover from a failure in either of the primary sets of components.

The downconverter 630a are each configured to process signals from i number of bands, where i is an integer. For example, the value of i may be 3, 4, or 5. As a result, each downconverter 630a provides i number of intermediate frequency outputs.

The intermediate frequency outputs from each of the downconverter 630a are provided to an intermediate frequency distribution network 640a. In this example, the IF distribution network 640a includes an IF switch matrix 641 that is configured to be able to couple any of the input signals from the downconverter 620a to any of various outputs of the switch matrix 641. This capability provides high versatility and redundancy in the event of failures of amplifiers, downconverters 630a and, demodulators 650a.

The receiver subsystem 600a includes a set of demodulators 650a, which are shown in two groups, a first group 651 with m number of primary demodulators 650a and a second group 652 of n number of secondary demodulators 650a. Each demodulator 650a processes 0.5 GHz to 2.0 GHz of bandwidth, depending on the implementation. For example, if there are two polarizations used and a tri-band downconverter 630a for each polarization, the value of variable m would be 3. There are double the number of m connections from the switch matrix 641 to the primary modulators, e.g., three outputs for RHCP and three outputs for LHCP.

For the second group of demodulators 650a, there are n number of outputs of the switch matrix 641, which is set according to the level of redundancy desired. For example, if one to one redundancy is desired, n equals m. As another example, if redundancy is desired for only half the capacity of the group 651 of primary demodulators 650a, then n can be half of m. The redundancy in the demodulators 650a between the first group 651 and the second group 652 can be the same level of redundancy as with the downconverters 630a and amplifiers 620, but is not required to be. For example, the system can be designed to provide an amount of modulator redundancy (e.g., a number of standby modulators equal to the number of primary modulators) that is greater than redundancy for the primary downconverters 630a or primary amplifiers 620 (e.g., one standby downconverter 630a and standby amplifier 620 for every two primary downconverters 630a and primary amplifiers 620). Optionally, for one-to-one redundancy for the modulators 650a, the number of secondary demodulators 650a and the number of links to the secondary demodulators 650a from the switch matrix 641 can be the same as the number of primary demodulators 650a and corresponding links to the switch matrix 641.

As noted above, the configuration of receiver subsystem 600a can be set to make use of various different bands and types of downconverters. Examples of these configurations are shown in FIG. 7.

Figure 7:
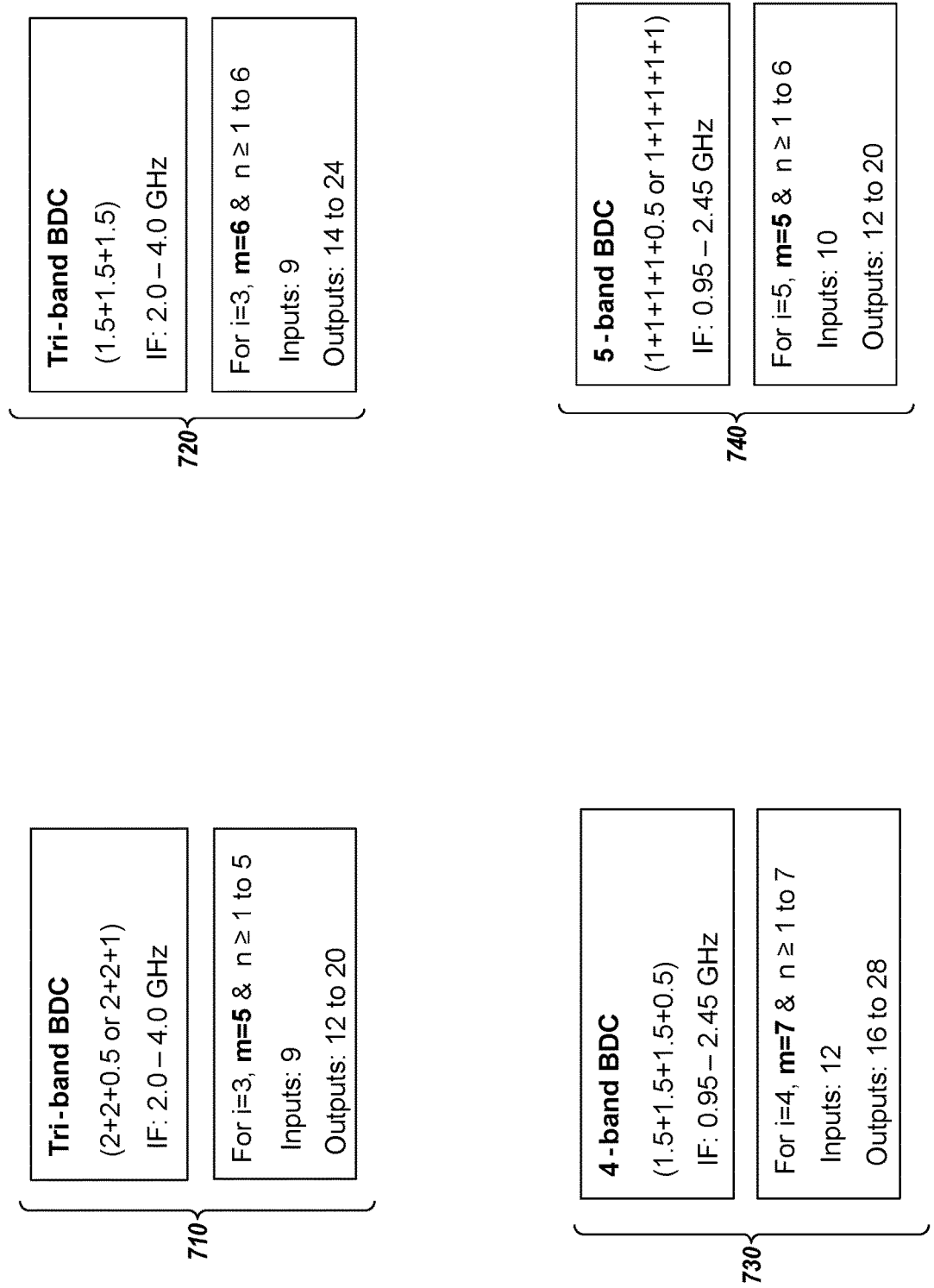
FIG. 7 is a diagram that illustrates parameters and characteristics of different channel and intermediate frequency options for downlink communication in the satellite gateway.

FIG. 7 shows four different examples of frequency and downconverter configurations that can be used in the receiver subsystem 600a of FIG. 6A.

The first configuration 710 uses tri-band downconverters, where the intermediate frequency outputs have a bandwidth of 2.0 GHZ, 2.0 GHZ, and 0.5 GHZ, respectively, or use a bandwidth of 2.0 GHZ, 2.0 GHz, and 1.0 GHz, respectively. The downconverters are configured to provide intermediate frequency signals in a range of 2.0 GHz to 4.0 GHz. In the configuration 710, with a tri-band downconverter, i=3. In this example, m equals 5, so 5 primary demodulators are used, and n secondary demodulators are used where the value of n can be a value of at least 1, and up to 5, to provide redundancy. This results in nine (e.g., 3×i) input lines to the switch matrix 641, and from 12 to 20 output lines from the switch matrix 641 depending on the level of demodulator redundancy desired.

The second configuration 720 uses tri-band downconverters, where the intermediate frequency outputs have a bandwidth of 1.5 GHZ, 1.5 GHZ, and 1.5 GHZ, respectively. The downconverters are configured to provide intermediate frequency signals in a range of 2.0 GHz to 4.0 GHz. In the configuration 720, with a tri-band downconverter, i=3. In this example, m equals 6, so 6 primary demodulators are used, and n secondary demodulators are used where the value of n can be a value of at least 1, and up to 6, to provide redundancy. This results in nine (e.g., 3×i) input lines to the switch matrix 641, and from 14 to 24 output lines from the switch matrix 641 depending on the level of demodulator redundancy desired.

The third configuration 730 uses quad-band downconverters, where the intermediate frequency outputs have a bandwidth of 1.5 GHZ, 1.5 GHZ, 1.5 GHZ, and 0.5 GHZ, respectively. The downconverters are configured to provide intermediate frequency signals in a range of 0.95 GHz to 2.45 GHz. In the configuration 730, with a quad-band downconverter, i=4. In this example, m equals 7, so 7 primary demodulators are used, and n secondary demodulators are used where the value of n can be a value of at least 1, and up to 7, to provide redundancy. This results in twelve (e.g., 3×i) input lines to the switch matrix 641, and from 16 to 28 (e.g., 2m+2n) output lines from the switch matrix 641 depending on the level of demodulator redundancy desired.

The fourth configuration 740 uses quad-band downconverters, where the intermediate frequency outputs have a bandwidth of 1.0 GHz, 1.0 GHz, 1.0 GHz, 1.0 GHz, and 0.5 GHZ, respectively. The downconverters are configured to provide intermediate frequency signals in a range of 0.95 GHz to 2.45 GHz. In the configuration 740, with a 5-band downconverter, i=5. In this example, m equals 5, so 5 primary demodulators are used, and n secondary demodulators are used where the value of n can be a value of at least 1, and up to 5, to provide redundancy. This results in fifteen (e.g., 3×i) inputs to the switch matrix 641, and from 12 to 20 (e.g., 2m+2n) outputs from the switch matrix 641 depending on the level of demodulator redundancy desired.

Referring again to FIG. 6A, the status monitoring module 260 receives monitoring inputs at various points in the receiver subsystem 600a. For example, the status monitoring module 660 can receive and monitor signals at the antenna feeds 601, 602, and also receive signals on the transmission lines from the downconverters 630a to the switch matrix 641 in the distribution network 640a. In addition, the status monitoring module 660 includes the capability to provide output to various points in the receiver subsystem 600a. For example, the status monitoring module can provide an output on a monitoring line 605 to provide test signals to the standby low noise amplifier 620 and downconverter 630a, and then can monitor the result of the input test signals with the connection 606. In addition, the status monitoring module 660 can be capable of transmitting signals to the antenna feeds 601, 602 to perform additional testing and monitoring of the primary amplifiers 620 and primary downconverters 630a.

The status monitoring module 660 also includes the capability to adjust the settings for the switches 610 and the switch matrix 641 of the IF distribution network 640a. This capability enables the status monitoring module 662 change the settings of the switches 610, so that either of the antenna feeds 601, 602 (but not both at the same time) can be selectively coupled to the standby low noise amplifier 620 and standby downconverter 630a (e.g., the middle path shown between the RHCP and LHCP paths). The status monitoring module 660 can also send control signals to the switch matrix 641 in the IF distribution network 640a to route signals to the appropriate inputs of the demodulators 650a. This allows the status monitoring module 662 respond to detected anomalies or failures and to change the routing of intermediate frequency output lines from the downconverter 630a to the different input transmission lines to the demodulators 650a by adjusting the settings of the switch matrix 641. For example, if a downconverter 630a or a low noise amplifier 620 fails, and the switches direct incoming RF signals to the standby amplifier 620 and downconverter 630a, the status monitoring module 660 adjusts the switch matrix 641 settings to route the outputs from the standby downconverter to the primary demodulator that is used. As another example, if there is a failure in one of the primary modulators, the status monitoring module 660 detects the failure and then adjust the switch matrix 641 settings to route the inputs to the failed demodulator to one of the secondary demodulators instead.

In addition, FIG. 6A also shows an example demodulator implementation 670 that may be used. In the demodulator implementation 670, a demodulator 671 can have two different sections 672a-672b, each with its own IF processing section 673 and ADC 674. Each section 675a-675b can have two IF inputs: (1) section 675a has a primary input 1P and a secondary output 1S, and (2) section 675b has a primary output 2P and a secondary output 2S. Each section 672a, 672b includes a switch 675a, 675b that selects between the two inputs to the section and couples only the selected input for demodulation. In this manner, the demodulator implementation 670 can provide switching ability to optionally share a single demodulator processing unit 671 among to intermediate frequency signals each selected from a different pair of input lines.

With the switch matrix 641, the receiver subsystem 600a provides very high versatility, as well as a level of redundancy that can vary according to the needs of the system.

Using the IF distribution network 640, signals downconverted from both the RHCP and LHCP antenna feeds 601, 602 can be routed to and analyzed by the demodulators 650a, which allows the demodulators 650a to provide cross polarization (XPOL) compensation.

Figure 6B:
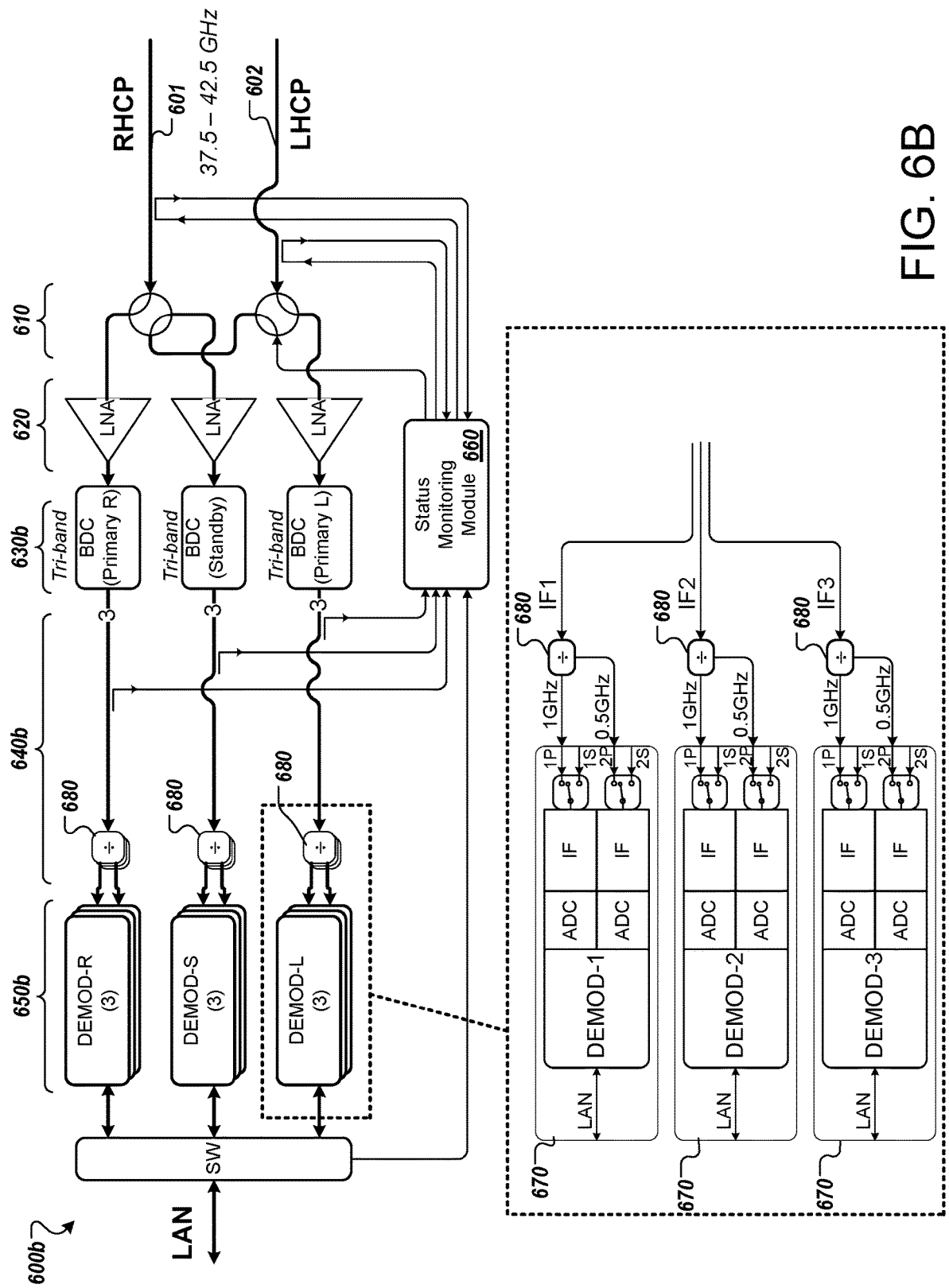

FIG. 6B shows another example receiver subsystem 600b. The receiver subsystem 600b includes the antenna feeds 601, 602, the RF switches 610, and low noise amplifiers 620. As discussed above, the receiver subsystem 600a also includes three downconverters 630b: a primary downconverter for the RHCP signals, a primary downconverter for the LHCP signals, and a standby downconverter. In this example, each of the downconverters 630b is a tri-band downconverter. For example, the three bands can each have a bandwidth of 1.5 GHz. In some cases, the intermediate frequency output for each downconverter output is from 0.5 GHz to 2.45 GHz.

Each of the three downconverters 630b has three output transmission lines or IFLs, for a total of 9 IFLs. The output lines of the downconverter 630b are provided through an IF distribution network 640b to a set of demodulators 650b. Unlike the receiver subsystem 600a of FIG. 6A, the receiver subsystem 600b does not used switching between the downconverter 630b and the demodulators 650b. Instead, direct connections are made between each downconverter 630b and a corresponding set of demodulators 650b. In other words, there are three different paths, one each for RHCP, LHCP, and standby, and after the routing of the switches 610, signals are not changed from one path to another.

However, each IFL is passed to a divider 680 that splits receive signals into two sub-bands or channels to be demodulated separately. For example, the demodulator implementation 670 can be used three times for each polarization, and at the front of each and demodulator implementation 670, a divider can separate the 1.5 GHz intermediate frequency bandwidth into two channels, one with 1.0 GHz bandwidth and another with 0.5 GHz bandwidth.

In the receiver subsystem 600b, the system uses a simple configuration of chain switching. Up to 2.0 GHz of bandwidth is used per IFL. Each demodulator processes 1.5 GHz of bandwidth. Three demodulators are used per path, for a total of nine demodulators.

Figure 6C:
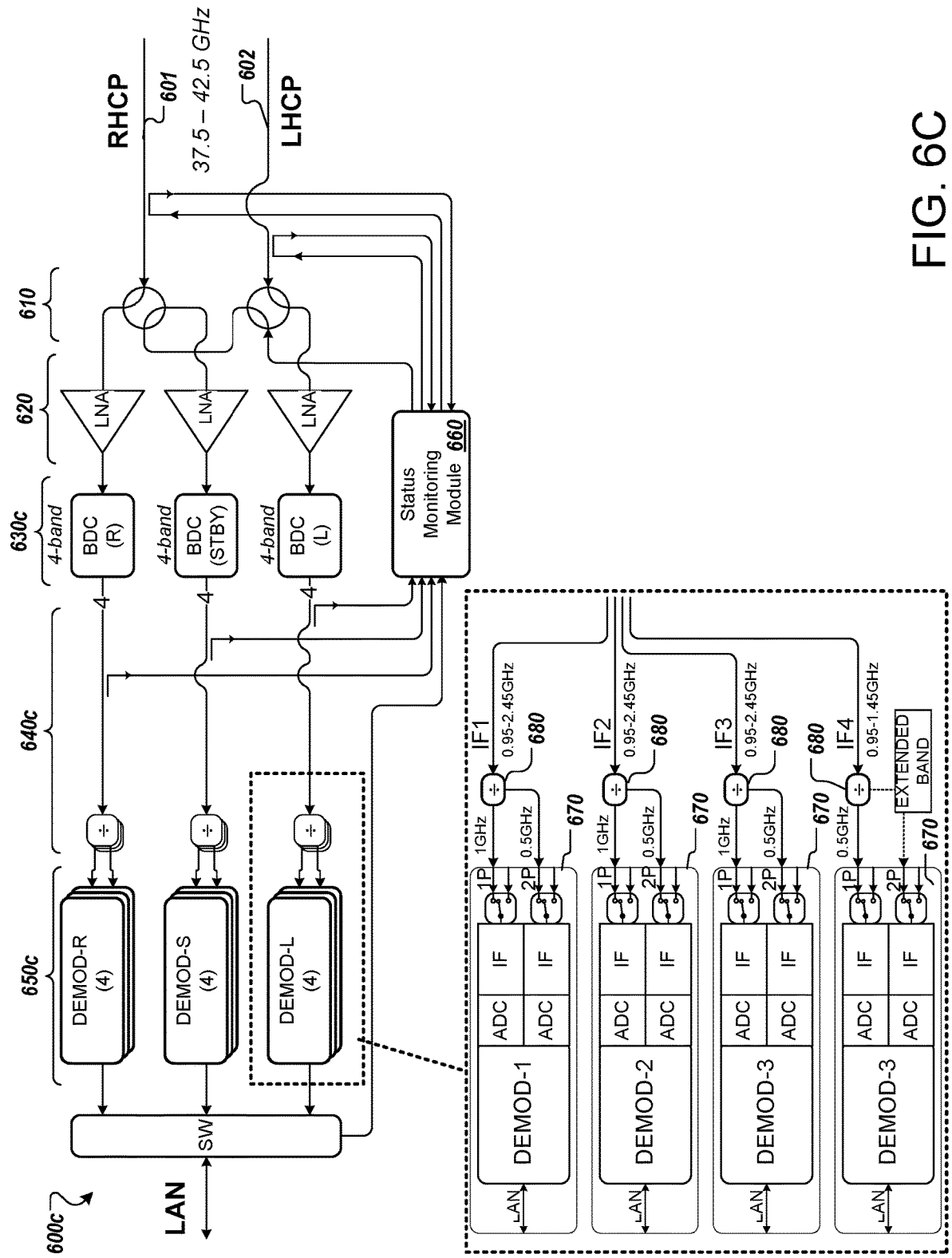

FIG. 6C shows another example receiver subsystem 600c. The receiver subsystem 600c has a structure and operation as described above for receiver subsystem 600b, but uses quad-band downconverters instead of tri-band downconverters, and uses four demodulators per receive path instead of three.

In the receiver subsystem 600c, up to 1.5 GHz is needed for IFL. Each demodulator processes 0.5 GHz of bandwidth to 1.5 GHz of bandwidth. Four demodulators 650c are used per path, for a total of 12 demodulators.

Each uplink path (e.g., RHCP and LHCP) includes four demodulators 650c, each implemented with the demodulator implementation 670. A different IFL is coupled to demodulator in the group. Each IFL carries a different intermediate frequency signal in the range of 0.95 GHz to 2.5 GHz for IF1-IF3, and 0.95 GHz to 1.45 GHz for IF4. A divider is provided before each of the demodulators. For IF1-IF3, the divider divides the incoming signal into a 1 GHz component and a 0.5 GHz component to facilitate demodulation. For IF4, only a 0.5 GHz signal is used. Nevertheless, the capability of the system can be extended by providing additional signals on IF4 and dividing them to provide an extended band for demodulation. An advantage of the receiver subsystem 600c is that passive elements are used in the distribution network 640c, and so no active switches or switch control or processing is required.

Figure 6D:
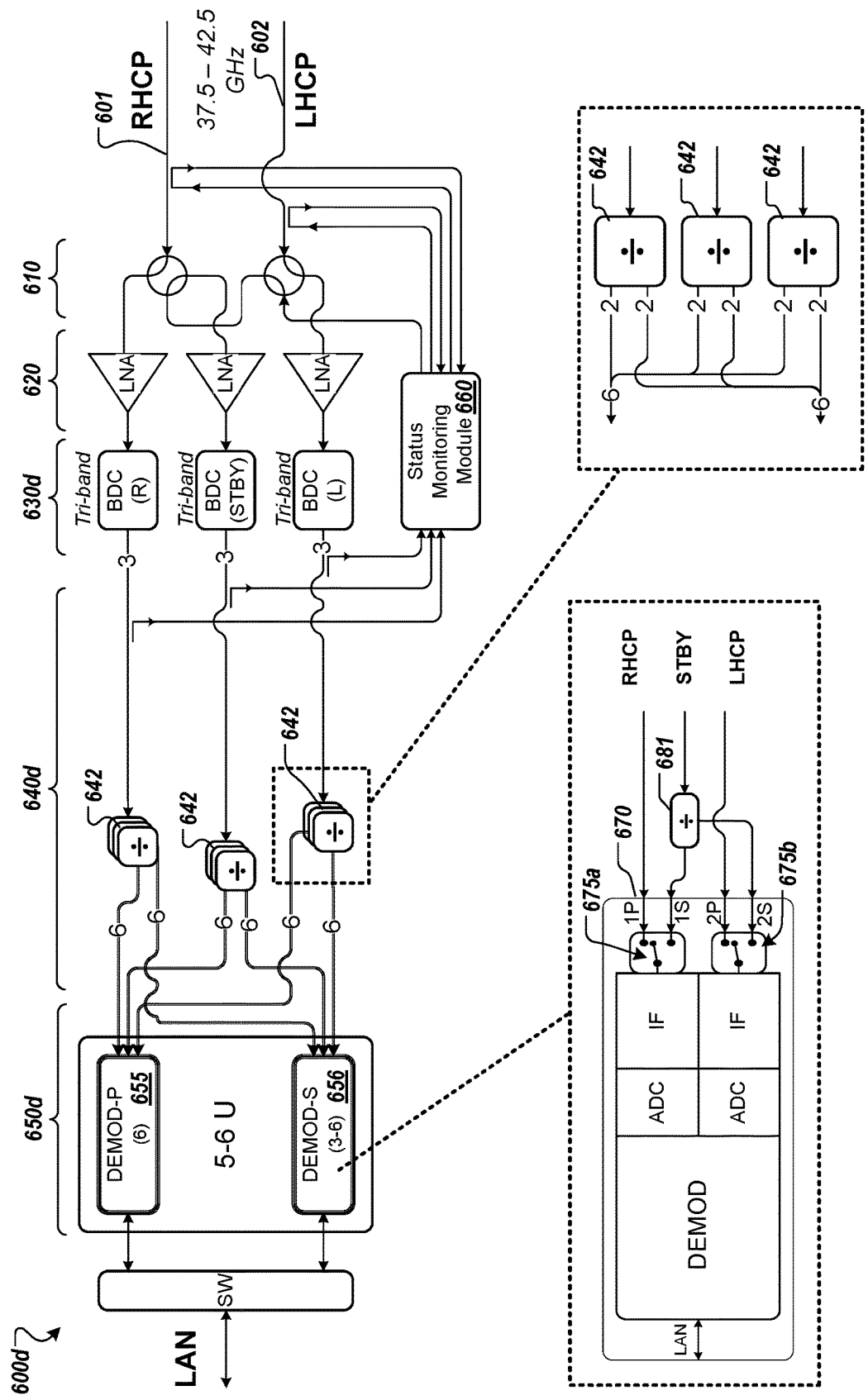

FIG. 6D shows an example of receiver subsystem 600d used to receive downlink signals in the gateway 110. In the example, a passive distribution scheme is used. The configuration shown in FIG. 6D has the ability to provide XPOL compensation. In addition, the configuration allows for path selection by the demodulators 650d. The system has six primary demodulators 650d and can include, for example, three to six standby demodulators 650d. The configuration makes use of a tri-band receiving process, in this case, a frequency arrangement in which each polarization has three intermediate signals each having a 1.5 GHz bandwidth. For example, each intermediate frequency signal can have a bandwidth from 0.95 GHz to 2.45 GHz.

The IF distribution network 640d includes a series of signal dividers 642. Each of the signal dividers 642 receives an IF signal (e.g., one band of one downconverter 630d) and splits the signal into two different frequency ranges, e.g., for different channels or groups of channels. Both output signals from the divider 642 are then provided to a demodulator in the group 655 as well as to a demodulator in the group 656.

In the example, element 643 shows a collection of three signal dividers 642 used for the primary LHCP path. The same structure and connections can similarly be used for the dividers 642 for the standby path and also for the RHCP path. A different band of output (e.g., one IF signal) from the LHCP downconverter 630d is provided to each divider 642. Each divider 642 divides the signal into two different frequency ranges or channel groups, and also splits those signals so that a copy of each of divided signal is sent to the upper path and lower path. As a result, all six of the divided outputs are provided to the group 655 of primary demodulators 650d, and all six of the divided outputs are also provided to the group 656 of secondary demodulators 650d.

The demodulator implementation 670 shows how a demodulator 650d can handle three incoming signals with two demodulator paths. For example, each demodulator 650d has connections to three input signals: an RHCP signal on the 1P input, an LHCP signal on the 2P input, and a signal from the standby demodulator on both the 1S and 2S inputs. The switches 675a, 675b in the demodulator allow selection of either a primary input (RHCP or LHCP) or the standby input provided through the divider 681.

Figure 6E:
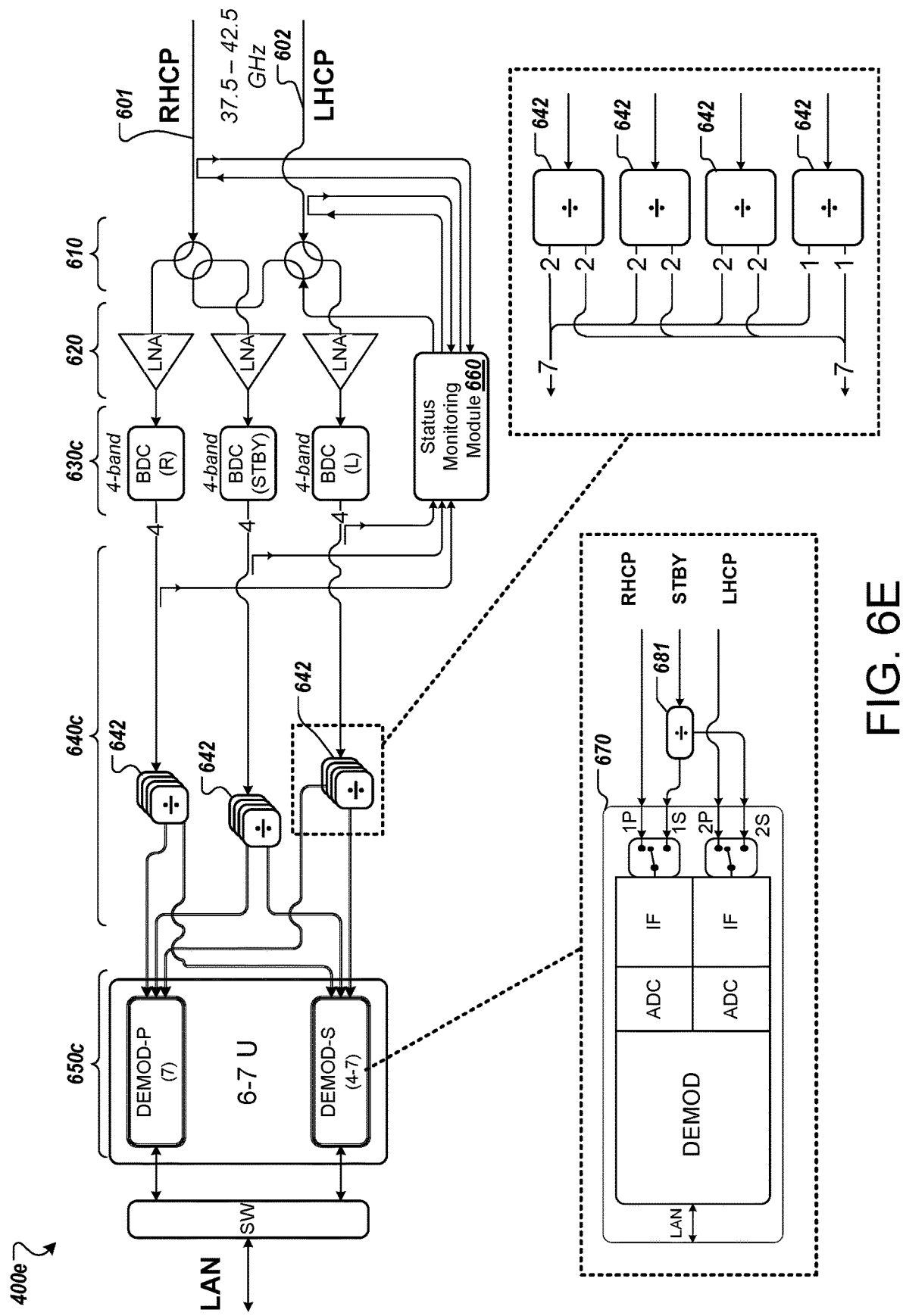

FIG. 6E shows an example of a receiver subsystem 600e that can be used to receive downlink signals in the gateway 110. The receiver subsystem 600e operates as discussed above for the receiver subsystem 600d, but uses quad-band downconverters 630c according to the frequency plan 560 of FIG. 5D. This results in a greater number of outputs from each downconverter 630c (e.g., four instead of three for FIG. 6D), and also involves four dividers 642 instead of three. In the example, the total bandwidth downconverted by each downconverter is 5.0 GHz. As discussed in FIG. 5D, there are three intermediate frequency signals that each have a bandwidth of 1.5 GHZ, and another that uses only 500 MHz of bandwidth. The 1.5 GHZ-wide IF signals can each be divided into two different signals, e.g., one with a 1.0 GHz bandwidth and another with 0.5 GHz bandwidth. In many cases, the demodulation process may be more efficient or may provide easier routing when signals having only one or two of the 500 MHz channels are demodulated from each input. The fourth IF signal does not need to be divided, as it carries only one channel of information to be demodulated.

Figure 6F:
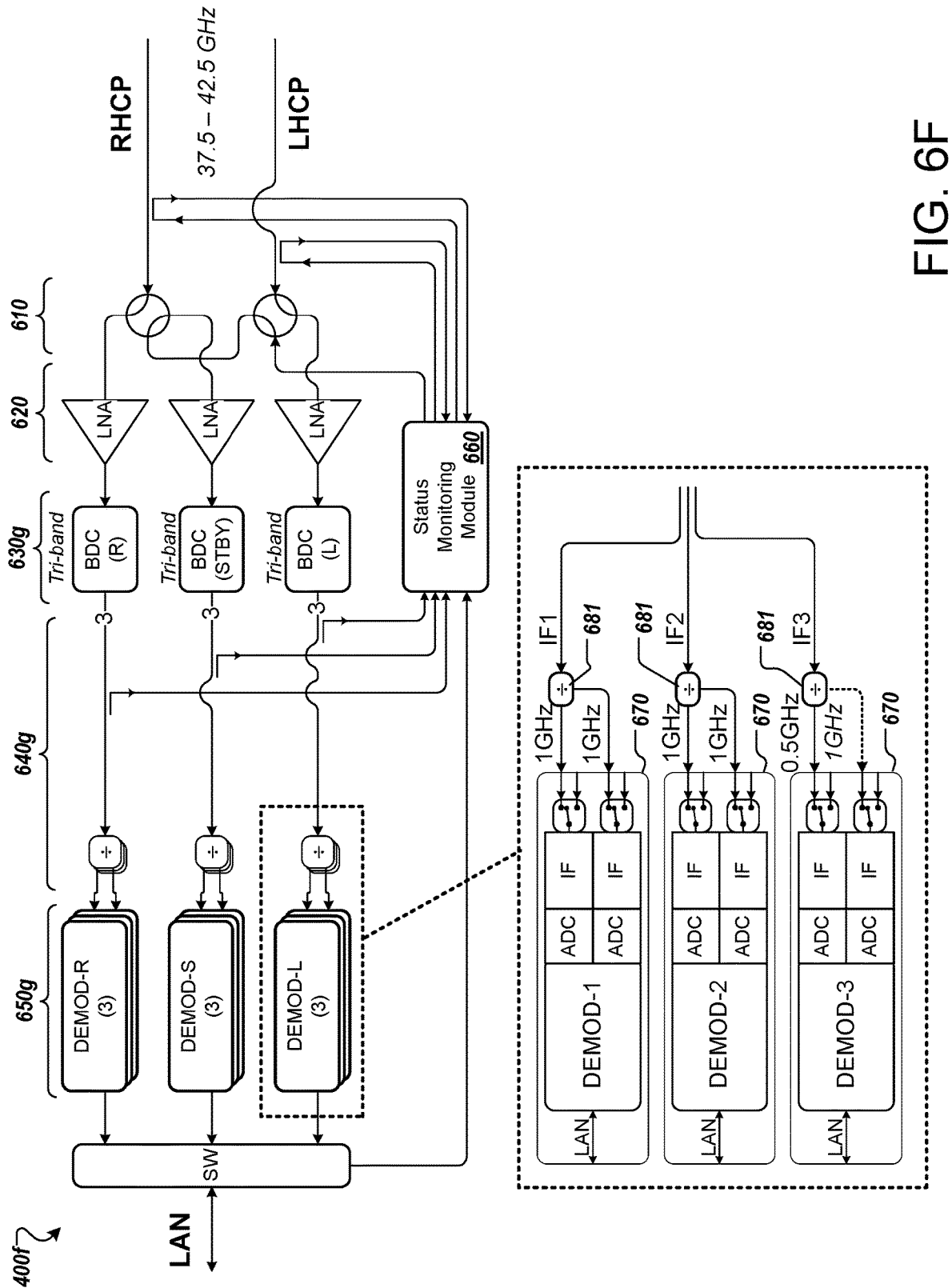

FIG. 6F shows an example of a receiver subsystem 600f that can be used to receive downlink signals in the gateway 110. The receiver subsystem 600f operates as described above for the receiver subsystem 600b of FIG. 6B, but uses different intermediate frequency ranges and bandwidths for IF1-IF3. For example the receiver subsystem 600f uses the downlink frequency plan 500 of FIG. 5A, which has intermediate frequencies of 2.0-4.0 GHz for IF1, 2.0-4.0 GHz for IF2, and 2.0-2.5 GHz for IF3. By contrast, the receiver subsystem 600b uses the downlink frequency plan 520 of FIG. 5B, in which all of IF1-IF3 are in the range of 0.95 GHz to 2.45 GHz.

Figure 6G:
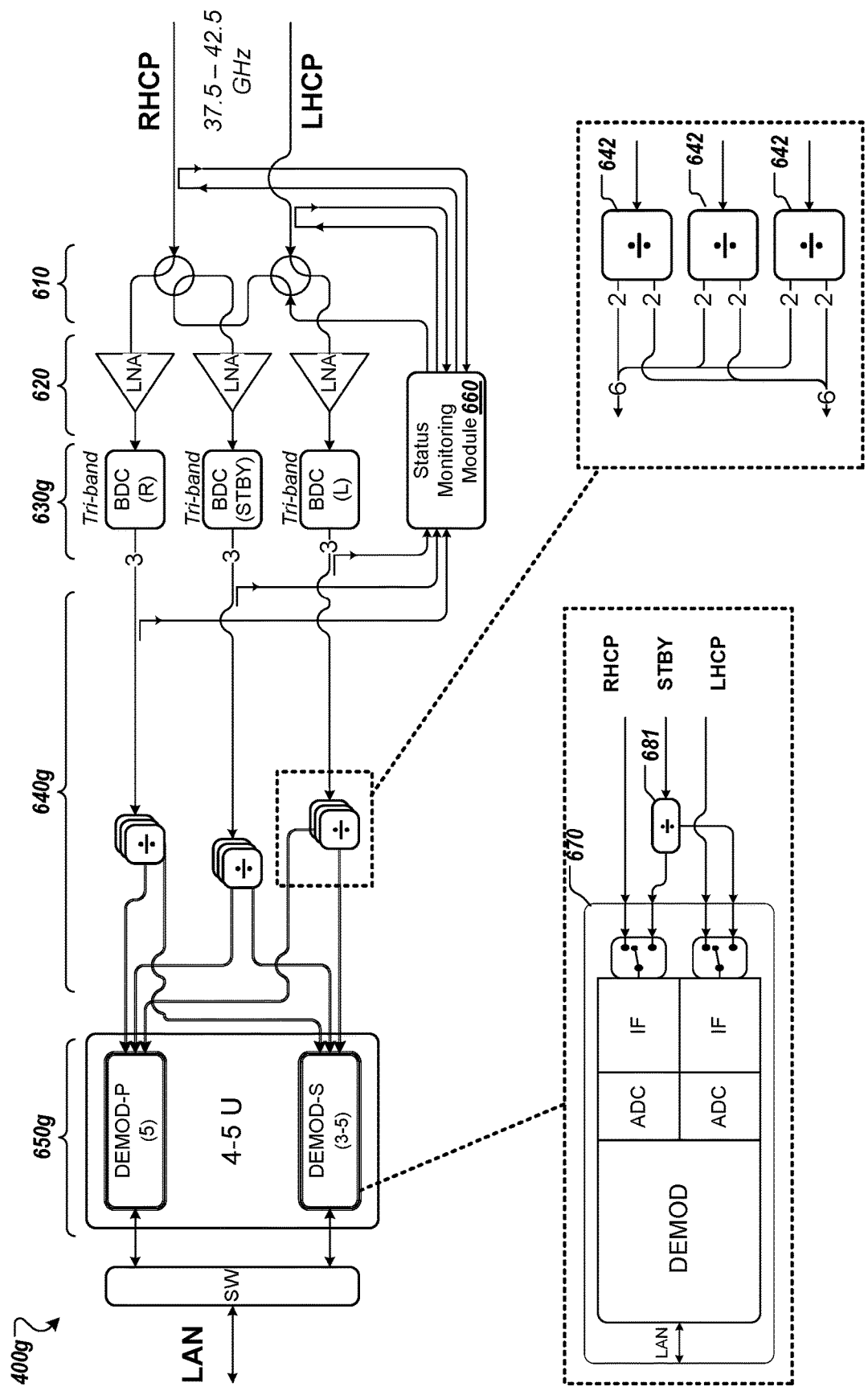

FIG. 6G shows an example of a receiver subsystem 600g that can be used to receive downlink signals in the gateway 110. The receiver subsystem 600g operates as described above for receiver subsystem 600d of FIG. 6D, but uses a different set of bands.

In the receiver subsystem 600g, each upconverter 630g provides three IF outputs, which can be split into 2.0 GHz, 2.0 GHz, and 0.5 GHz, respectively, for receiving a total of 4.5 GHz (e.g., nine 500 MHz channels). The three IF outputs of each upconverter 630g can alternatively be 2.0 GHz, 2 GHZ, and 1.0 GHz, respectively, for receiving a total of 5.0 GHz (e.g., ten 500 MHz channels). The intermediate frequency signals are in the range from 2.0 GHz to 4.0 GHz. This arrangement is different from the intermediate frequencies used in the example of FIG. 4D, which have a frequency range of 0.95 GHz to 2.45 GHz and are split into three groups of 1.5 GHZ, 1.5 GHZ, and 1.5 GHz.

A number of embodiments have been described. Nevertheless, it will be understood that various modifications can be made without departing from the spirit and scope of the invention. In addition, the logic flows depicted in the figures do not require the particular order shown, or sequential order, to achieve desirable results. In addition, other steps can be provided, or steps can be eliminated, from the described flows, and other components can be added to, or removed from, the described systems.

A number of implementations have been described. Nevertheless, it will be understood that various modifications may be made without departing from the spirit and scope of the disclosure. For example, various forms of the flows shown above may be used, with steps re-ordered, added, or removed.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, e.g., one or more modules of computer program instructions encoded on a computer readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the invention have been described. Other embodiments are within the scope of the following claims. For example, the steps recited in the claims can be performed in a different order and still achieve desirable results.

What is claimed is:

1. A transmitter system comprising:
    a set of modulators comprising (i) one or more first modulators to modulate signals for transmission using a first of multiple polarizations, and (ii) one or more second modulators to modulate signals for transmission using a second of the multiple polarizations, wherein the one or more modulators for each polarization are configured to provide multiple intermediate frequency outputs that overlap in frequency range and carry different data;
    a set of upconverters comprising at least one upconverter for each of the multiple polarizations, wherein each of the upconverters is configured to generate a radiofrequency output by concurrently upconverting multiple intermediate frequency inputs to different frequency ranges;
    an intermediate frequency distribution network configured to distribute the multiple intermediate frequency output signals from each of the modulators to the inputs of the upconverters; and
    a set of radiofrequency switches that are operable to selectively provide the radiofrequency outputs of the upconverters to antenna feeds for the multiple polarizations.

2. The transmitter system of claim 1, wherein each of the upconverters is configured to receive and upconvert three or four intermediate frequency signals to generate the radiofrequency output of the upconverter.

3. The transmitter system of claim 1, wherein the intermediate frequency distribution network comprises a switch matrix that is programmable to selectively provide intermediate frequency outputs from any of the modulators to any of the upconverters.

4. The transmitter system of claim 1, wherein the intermediate frequency distribution network comprises a set of switches that are programmable to selectively provide cross-switching to change routing of the intermediate frequency outputs from the modulators to different upconverters.

5. The transmitter system of claim 1, wherein the modulators each have a primary output and a secondary output for each intermediate frequency output, and each of the modulators includes a switch to select between providing output on the primary output or the secondary output; and
    wherein the intermediate frequency distribution network comprises a set of summing elements that each combine (1) intermediate frequency signals on a primary output of a modulator for the first polarization and (2) intermediate frequency signals on a secondary output of a modulator for the first polarization, the intermediate frequency distribution network being configured to provide the combined output of the respective summing elements as inputs to the upconverters.

6. The transmitter system of claim 1, wherein the multiple polarizations include right-hand circular polarization and left-hand circular polarization.

7. The transmitter system of claim 1, wherein the transmitter system is configured to transmit signals in the V band, over a bandwidth of at least 4 GHz.

8. The transmitter system of claim 1, wherein the transmitter system is configured to transmit data for a plurality of different channel segments, and each of the multiple intermediate frequency outputs of the modulators includes modulated signals for multiple of the channel segments.

9. The transmitter system of claim 8, wherein the transmitter system is configured to transmit signals for each of the multiple polarizations in multiple channel segments each having bandwidth between 250 MHz and 2 GHz.

10. A method comprising:
receiving, over a network interface, data for transmission in a satellite communication system;
generating multiple intermediate frequency outputs for each of multiple polarizations by modulating one or more carriers based on the data for transmission using one or more first modulators for a first polarization and one or more modulators for a second polarization, wherein the one or more modulators for each polarization are configured to provide multiple intermediate frequency outputs that overlap in frequency range and carry different data;
distributing the multiple intermediate frequency output signals for each polarization from the modulators to the inputs of a set of upconverters, the set of upconverters comprising at least one upconverter for each of the multiple polarizations;
upconverting, for each polarization, the multiple intermediate frequency outputs for the polarization using the at least one upconverter for the polarization, wherein each of the upconverters is configured to generate a radiofrequency output by concurrently upconverting multiple intermediate frequency inputs to different frequency ranges; and
routing the radiofrequency outputs to antenna feeds using a set of radiofrequency switches.

11. The method of claim 10, comprising:
receiving radiofrequency signals for each of the multiple polarizations;
downconverting the radiofrequency signals using (i) a first downconverter to downconvert signals received for the first polarization, and (ii) a second downconverter to downconvert signals received for the second polarization, wherein each of the downconverters is configured to provide multiple intermediate frequency outputs that overlap in frequency range and carry different data;
distributing the multiple intermediate frequency output signals from the downconverters to inputs of a set of demodulators using a second intermediate frequency distribution network, the set of demodulators comprising at least one demodulator for each of the multiple polarizations;
demodulating the multiple intermediate frequency output signals from the downconverters using the set of demodulators; and
providing, to a communication network, extracted data obtained from demodulating the multiple intermediate frequency output signals.

* * * * *